US011403775B2

(12) United States Patent
Momcilovic et al.

(10) Patent No.: US 11,403,775 B2
(45) Date of Patent: Aug. 2, 2022

(54) ACTIVE MARKER ENHANCEMENTS FOR PERFORMANCE CAPTURE

(71) Applicant: Weta Digital Limited, Wllington (NZ)

(72) Inventors: Dejan Momcilovic, Wellington (NZ); Jake Botting, Wellington (NZ)

(73) Assignee: UNITY TECHNOLOGIES SF, San Francisco, CA (US)

(*) Notice: Subject to any disclaimer, the term of this patent is extended or adjusted under 35 U.S.C. 154(b) by 0 days.

(21) Appl. No.: 17/107,915

(22) Filed: Nov. 30, 2020

(65) Prior Publication Data

US 2021/0270923 A1    Sep. 2, 2021

Related U.S. Application Data

(60) Provisional application No. 63/055,114, filed on Jul. 22, 2020, provisional application No. 63/055,112, (Continued)

(51) Int. Cl.
*G06T 7/557*    (2017.01)
*G06F 1/16*    (2006.01)
(Continued)

(52) U.S. Cl.
CPC ............ *G06T 7/557* (2017.01); *G01S 1/7034* (2019.08); *G06F 1/163* (2013.01); *G06T 7/90* (2017.01);
(Continued)

(58) Field of Classification Search
CPC ....... G01S 1/7034; G06F 1/163; G06T 13/40; G06T 7/557; G06T 7/90; H04N 5/33; H04N 9/04
See application file for complete search history.

(56) References Cited

U.S. PATENT DOCUMENTS 4,631,650 A * 12/1986 Ahroni ................ F21V 21/002
174/114 R
5,703,428 A * 12/1997 Borgis .................... H01J 61/30
313/318.1
(Continued)

FOREIGN PATENT DOCUMENTS

CN    209784950    * 12/2019
WO    2018054338 A1    3/2018

OTHER PUBLICATIONS

Chatzitofis et al., "DeepMoCap; deep optical motion capture using multiple depth sensors and retro-reflectors", 2019, 2019: Year.
(Continued)

*Primary Examiner* — James T Boylan
(74) *Attorney, Agent, or Firm* — Trellis IP Law Group, PC; Lisa Benado

(57) ABSTRACT

An active marker apparatus is provided for securely affixing active markers to a wearable article of an object in a performance capture system. The active marker light components coupled to a strand, are inserted into a receptacle to position the active marker light components onto the wearable article. A gap is provided in a chamber between the active marker light component and an interior surface of a protrusion portion of the receptacle. At least a section of the protrusion portion permits light emitted from the active marker light component into the chamber, to diffuse in a manner that allows the light to be easily detected by a camera in the live action scene. Each active marker light component is locked into place in a respective receptacle by one or more channels that receive the strand. A cap fitting may further assist in securing the receptacle to the wearable article and optionally aid in visual detection of the receptacle.

20 Claims, 14 Drawing Sheets

Related U.S. Application Data filed on Jul. 22, 2020, provisional application No. 62/983,523, filed on Feb. 28, 2020.

(51) Int. Cl.
| | |
|---|---|
| *G06T 7/90* | (2017.01) |
| *G01S 1/70* | (2006.01) |
| *G06T 13/40* | (2011.01) |
| *H04N 9/04* | (2006.01) |
| *H04N 5/33* | (2006.01) |

(52) U.S. Cl.
CPC ............... *G06T 13/40* (2013.01); *H04N 9/04* (2013.01); *H04N 5/33* (2013.01)

(56) References Cited

U.S. PATENT DOCUMENTS

| | | | |
|---|---|---|---|
| 6,324,296 | B1 | 11/2001 | McSheery |
| 6,801,637 | B2 | 10/2004 | Voronnka |
| 7,629,994 | B2 | 12/2009 | Dobrin |
| 10,373,517 | B2 | 8/2019 | Becker |
| 10,573,050 | B1 | 2/2020 | Liu |
| 10,593,101 | B1 | 3/2020 | Han |
| 10,657,704 | B1 | 5/2020 | han |
| 10,701,253 | B2 | 6/2020 | Knoll |
| 10,812,693 | B2 | 10/2020 | Estebecorena |
| 2004/0161246 | A1 | 8/2004 | Matsutshita |
| 2005/0105772 | A1 | 5/2005 | Voronka |
| 2008/0246694 | A1 | 10/2008 | Fischer |
| 2009/0086482 | A1* | 4/2009 | Wilm ..................... F21V 9/08 362/235 |
| 2009/0270193 | A1 | 10/2009 | Stremmel |
| 2011/0025853 | A1 | 2/2011 | Richardson |
| 2012/0212890 | A1* | 8/2012 | Hoshino ............ H04M 1/0202 361/679.01 |
| 2012/0307021 | A1 | 12/2012 | Tsai |
| 2014/0320667 | A1 | 10/2014 | Densham |
| 2015/0252955 | A1* | 9/2015 | Boschetto ............ F21V 23/002 362/249.02 |
| 2015/0336012 | A1 | 11/2015 | Stenzler |
| 2015/0336013 | A1 | 11/2015 | Stenzler |
| 2015/0356737 | A1 | 12/2015 | Ellsworth |
| 2017/0177939 | A1 | 6/2017 | Beall |
| 2017/0305331 | A1 | 10/2017 | Soehner |
| 2017/0366805 | A1 | 12/2017 | Sevostianov |
| 2018/0131880 | A1 | 5/2018 | Hicks |
| 2018/0242834 | A1* | 8/2018 | Hetling ................ A61B 3/0008 |
| 2018/0303383 | A1* | 10/2018 | Connor .................. G06F 3/011 |
| 2018/0306898 | A1 | 10/2018 | Pusch |
| 2019/0226646 | A1* | 7/2019 | Dvash ..................... F21K 9/238 |
| 2019/0257912 | A1 | 8/2019 | Remelius |
| 2020/0082211 | A1* | 3/2020 | Alladi .................. G06K 9/6211 |

OTHER PUBLICATIONS

Nageli et al., "Flycn: real-time environment-independent multi-view human pose estimation with aeriel vehicles", 2018 [Year: 2018].

\* cited by examiner

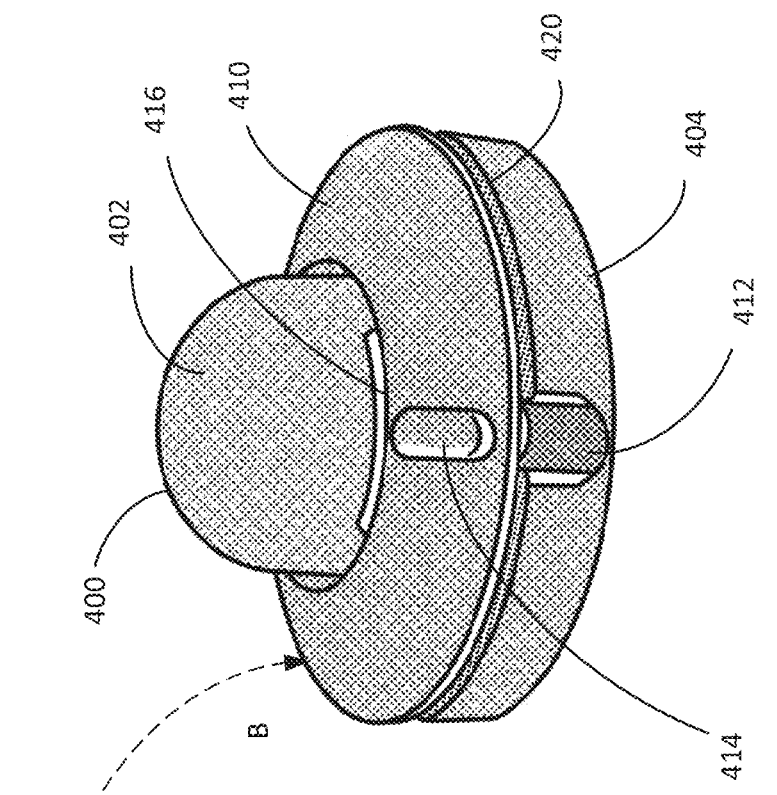
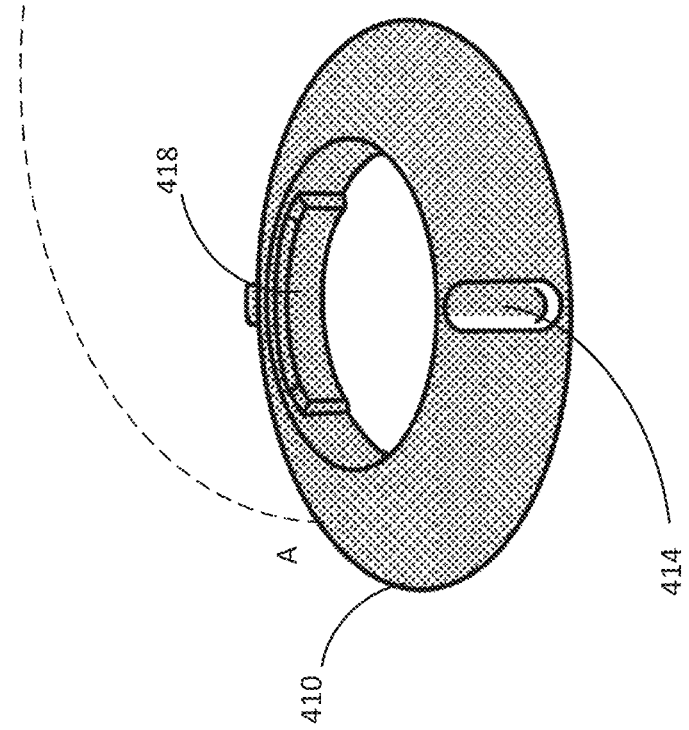
FIG. 4a
FIG. 4b

ACTIVE MARKER ENHANCEMENTS FOR PERFORMANCE CAPTURE

CROSS REFERENCES TO RELATED APPLICATIONS

This application claims the benefit of U.S. Provisional Patent Application Ser. No. 62/983,523, entitled ACTIVE MARKER DEVICE FOR PERFORMANCE CAPTURE, filed on Feb. 28, 2020 (WD0032PP1); U.S. Provisional Patent Application Ser. No. 63/055,112, entitled ACTIVE MARKER ENHANCEMENTS FOR PERFORMANCE CAPTURE, filed on Jul. 22, 2020 (WD0032PP2); and U.S. Provisional Patent Application Ser. No. 62/055,114, entitled SEALED ACTIVE MARKER ENHANCEMENTS FOR PERFORMANCE CAPTURE, filed on Jul. 22, 2020 (WD0032PP3), which are all hereby incorporated by reference as if set forth in full in this application for all purposes.

This application is related to the following applications. U.S. patent application Ser. No. 17/107,926, entitled ACTIVE MARKER ATTACHMENT FOR PERFORMANCE CAPTURE, filed on Nov. 30, 2020 (WD0032US4) and U.S. patent application Ser. No. 17/107,920, entitled SEALED ACTIVE MARKER FOR PERFORMANCE CAPTURE, filed on Nov. 30, 2020 (WD0032US3), which are hereby incorporated by reference as if set forth in full in this application for all purposes.

FIELD OF THE INVENTION

The present disclosure generally relates to visual productions and more particularly to active marker apparatuses for performance capture systems.

BACKGROUND

Many visual productions, such as movies, videos, clips, and recorded visual media, combine real and digital images to create animation and special effects. For example, a visual production may employ performance capture systems to detect shapes, movements, and facial expressions, of a live actor on a location shoot and produce a realistic-seeming computer-generated ("CG," "virtual," or "digital") character.

In performance capture (or "motion capture"), optical-based markers are attached to physical objects in a live scene. Light from the markers are recorded to establish position, orientation, and movement of the objects. Active markers have one or more light sources that emit light of specific wavelengths, e.g. infrared, detectable by particular camera devices. The information gathered from active marker detection is processed for animation, for example, mapped to a 3-D model to create a CG representation.

Recording of live action can require many costly "takes" if a shot is not right. A malfunction in the equipment may mean more time and money spent in its repair or replacement during the shoot. During a live action shoot, markers on objects are susceptible to being damaged or moved from, disrupting marker tracking. Markers may slip from their position on an object, be subjected to destructive forces, be exposed to environmental elements, etc. It may be also necessary to swiftly exchange active markers during a production shoot. It is important to prevent mishaps from occurring with the performance capture equipment during live action recording and to ensure proper recording of marker data.

SUMMARY

Implementations of this application relate to an active marker apparatus that houses at least one active marker light component capable of emitting light of at least one wavelength range for detection in a performance capture system. The present active marker apparatus enables secure affixing of active marker light components to a wearable article of an object.

A receptacle is provided to house an active marker light component. The receptacle has a protrusion portion to be positioned on an outer side of the wearable article and a base portion coupled to a lower side of the protrusion portion. At least a portion of the protrusion portion is transmissive (possesses transmissivity) to one or more wavelengths of the light emitted from the active marker light component into an interior chamber area of the protrusion portion. The base portion may include at least one channel extending to an interior location in the receptacle, for example, extending from an exterior port to an area proximal to the chamber. The at least one channel is configured to receive a strand coupled to the active marker light component and enable positioning of the active marker light component within the receptacle. In some implementations, the base portion may have a diameter greater than a diameter of the lower side of the protrusion portion, for positioning the base portion on an inner side of the wearable article.

In some implementations, a fitting (also referred to as a "cap fitting") is provided to removably connecting around at least a part of the protrusion portion on the outer side of the wearable article. The fitting may include a color distinct from a color of the outer side of the wearable article. The fitting may include at least one ridge to rotatably engage with a corresponding groove in an exterior surface of the protrusion portion and secure the base portion to an inner side of the wearable article. In some implementations, the fitting may be opaque for preventing leakage of light from the active marker light component through the base portion, thus concentrating light diffusion from the protrusion portion.

The strand may include at least one wire for electrical communication between a control unit and the active marker light component. In other implementations, the strand may be non-conductive. In still some implementations, the at least one channel of the base portion may include one or more bumps for engaging the strand. The strand may include an interior wire extending from the active marker light component to a control unit, for example, to serve as a conduit for power and/or electrical communication to activate/deactivate light emissions.

In some implementations, a performance capture system is provided that includes a plurality of active marker light components coupled to a strand and that a plurality of active marker light components that are coupled to a strand and that emit light of at least one particular wavelength range. A plurality of receptacles may be also provided that correspond with the active marker light components. Each of the receptacles includes a protrusion portion that has at least one section, e.g. a surface area, that is transmissive to light of at least one wavelength range from the chamber. The light is emitted into the chamber from a respective active marker light component. At least one slot of the protrusion portion is for receiving the respective active marker light component.

The receptacles also include a base portion coupled to a lower side of the protrusion portion for placement at an inner side of the wearable article. The base portion may include at least one channel extending from an exterior port to an interior of the receptacle. Each channel is configured to receive a strand coupled to the respective active marker light component. At least one sensor device may be further provided to detect at least one wavelength of light dispersed from the at least portion of the protrusion portion.

The receptacles may also have a fitting configured to removably connect around at least a part of the protrusion portion on an outer side of a wearable article. In some implementations, the protrusion portion may include a distinct color and the system further may include a camera device to detect at least one of a shape, color, or visible light of the fitting. In some implementations, at least one active marker light component is configured to emit multiple wavelengths of light and dedicated sections of the protrusion portion may be transmissive to different wavelengths of the multiple wavelengths of the light from the active marker light component.

A further understanding of the nature and the advantages of particular embodiments disclosed herein may be realized by reference to the remaining portions of the specification and the attached drawings.

BRIEF DESCRIPTION OF THE DRAWINGS

Various embodiments in accordance with the present disclosure will be described with reference to the drawings.

FIGS. 4a and 4b illustrate various views of an exemplary cap fitting of a receptacle for an active marker light component, in which FIG. 4a is a view of the cap fitting, and FIG. 4b is an exemplary capped receptacle, in accordance with some implementations.

DETAILED DESCRIPTION

Figure 1:
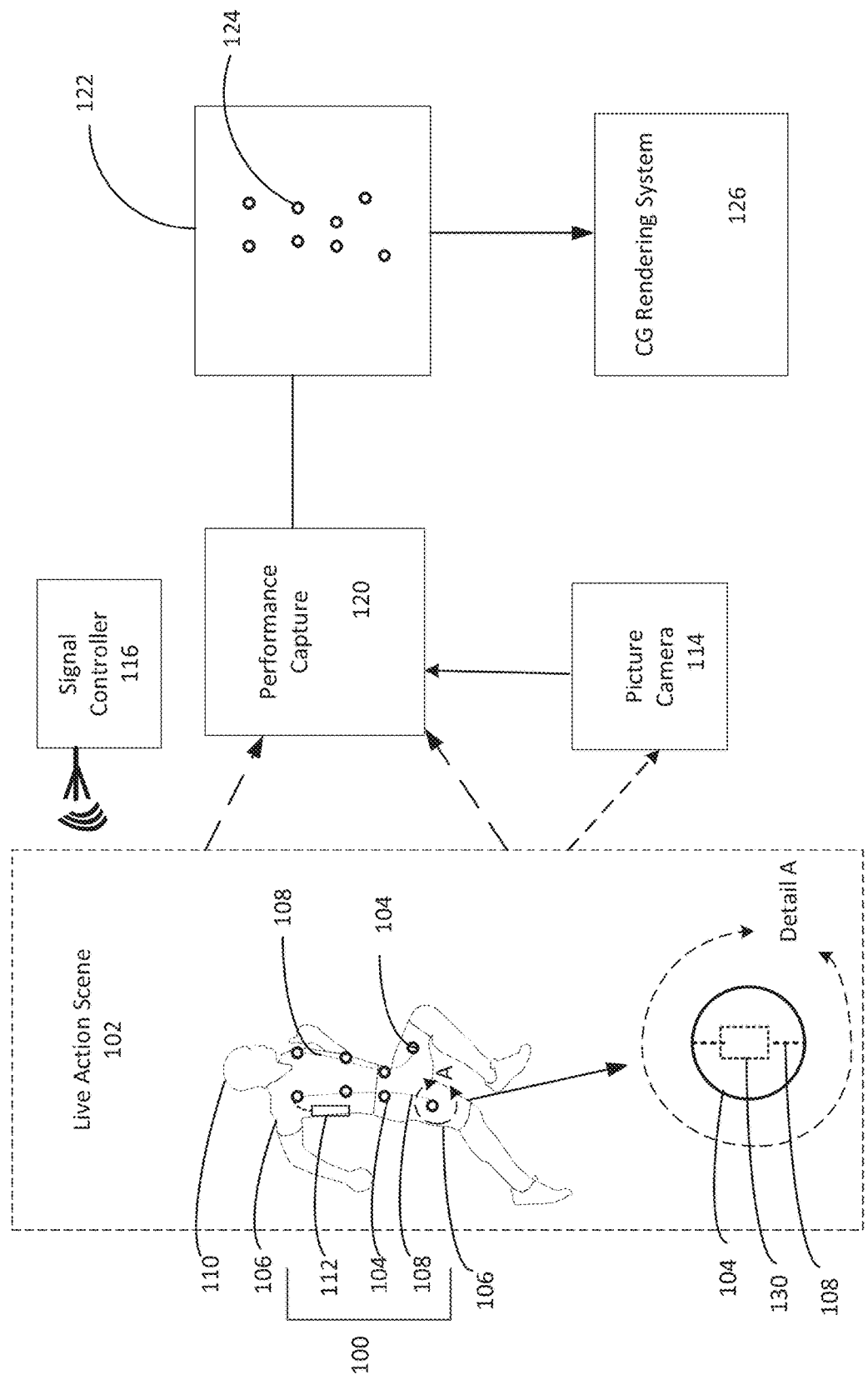
FIG. 1 is a conceptual diagram illustrating exemplary imagery of light signals from a plurality of active marker light components on a person, in accordance with some implementations.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present performance capture system employs an active marker apparatus to securely affix active marker light components to a wearable article that may be worn by an object, e.g. an actor, in a live action scene. An active marker light component is inserted into a receptacle that is securely attached to the wearable article, reducing risk that the active marker light component may slip.

The active marker apparatus is configured to maintain a close profile with the wearable article once the active marker apparatus is attached to the wearable article. The present active marker apparatus allows the wearable article, e.g. a garment, to be preinstalled with the active marker light components in designated positions on the article prior to wardrobing by the actor. The present active marker apparatus may be conveniently attached and detached to/from the wearable article. Deployment of the receptacles may avoid a need for other semi-permanent fasteners, such as sewing of active markers which requires additional time and attention, or use of hook and loop fasteners, which may be less reliable or snag onto other items.

The receptacle includes a gap formed in a chamber between the active marker light component and an interior surface of a protrusion portion of the receptacle. The chamber receives light from the active marker light component. The protrusion portion permits the light to diffuse such that the light is easily detected by a camera in the live action scene. The active marker light component may be locked into place in the receptacle by one or more channels that receive a strand to which the active marker light component is attached. In some implementations, the active marker light component may be electrically coupled to the strand that encases a wire(s) extending from a control unit. The strand and control unit may be tucked underneath the wearable article. A cap fitting may rotatably lock the receptacle to the wearable article and optionally aid in visual detection of the receptacle.

A user of the performance capture system employing the present active marker apparatus might be a person who contributes to the making of the visual production. For example, the user may include an individual at the live action shoot, such as a director, a cinematographer, an on-location crew member, an actor, a special effects person, etc. The user may also include an individual responsible for animation of the visual production, such as an artist, a graphics manager, etc.

For the purposes of the present discussion, an object in a live action scene that bears the active marker light components may be any physical object that can receive a wearable article. For example, objects can include persons (such as actors), inanimate items (such as props), animals, parts of an object, etc.

The wearable article bearing the active marker light components may be any item covering at least a portion of the object in the live action scene, such as a garment, shoe, accessory, hat, glove, strap, cover, etc. For example, the wearable article may be a skin-tight suit made of elastic fabric.

Performance capture systems provide a valuable tool to generate data in a live action shoot for animation specialists to use. Live action shoots are typically expensive to run and delays can add significantly to the overall cost of the production. It is desirable for the equipment used in performance capture to be easily installed and visible to cameras located in various locations at a shoot. Some prior systems include markers that are individually mounted onto an actor, taking time away from shooting of the scene. Light presented by active marker light components of the present active marker apparatus is projected at various angles for detection. In addition, some implementations include secondary detection sources, e.g. colored and/or specifically shaped parts, e.g. a cap fitting, which can serve as additional points of detection by different camera devices.

An actor may be equipped with multiple active marker light components attached to various locations on the wearable article with groups of active marker light components being connected by one or more strands, such as tubes enclosing one or more wires extending through a conduit in the tubes.

Often visual productions involve action on the part of an object. For example, an actor may need to run, jump, crawl, fight, etc. in a scene. Actors need to be able to move freely without restriction by the performance capture equipment. An active marker light component may get caught on or butted against other surfaces in the live action scene, such as a floor, prop, another object/actor, etc. The present active marker apparatus maintains a close profile to the wearable article. The strands, portions of the receptacle, and a control unit may be positioned beneath the wearable article.

Markers being worn by such an object, e.g. an actor, are also fraught with the potential for damage. Active marker light components on moving live actors/objects can undergo stresses that may result in the active marker light components separating from the wearable article. Various implementations of the present active marker apparatus include a variety of fasteners suitable for different circumstances of a live action shoot to ensure the active marker light component stays securely in place. For example, in one implementation, a cap fitting locks a protrusion portion of the receptacle onto the wearable article. In addition, the active marker light component is held in position within the receptacle by the strand being clamped into place within channels in the receptacle.

Other benefits of the active marker apparatus will be apparent from the further description of the system, as described below.

Various components of a visual production system include (1) live action components such as the present performance capture system for generating visual data from a live action scene, (2) virtual production components for generating CG graphic information based on the visual data, and (3) content compositing components for generating output images. Any of the system components may communicate with the other components through a network or other data transfer technologies.

As shown in FIG. 1, a performance capture system 120 is employed to detect light diffused from an active marker apparatus 100. The active marker apparatus 100 includes a plurality of active marker receptacles 104 encasing respective active marker light components 130 positioned in an internal cavity of the active marker receptacle 104 (as shown in the view Detail A). Groups of active marker light components 130 may be coupled, e.g. electronically coupled, to strands 108, which may be positioned underneath a wearable article 106 and fastened to an internal surface of the wearable article. For example, each strand 108 may extend from a control unit 112 to electronically control and sync the pulsing of light by the active marker light components 130. The active marker receptacles 104 may be configured to attach to wearable articles 106 (a shirt and pants) on a person 110 in a live action scene 102. In some implementations, some active marker receptacles may be positioned directly on the person 110, such as with adhesive, rather than on the wearable article 106. The live action scene 102 defines the space available for recording and may include a motion production set, a performing stage, an event or activity, a natural outdoor environment, etc. The active marker light components 130 emit light that diffuses from the active marker receptacles 104 for detection by the performance capture system 120.

The light source of the active marker light component 130 may be infrared LED between 700 nm and (850 nm) or other types of light including ultraviolet and visible light. In some implementations, a different wavelength of light or filters, or combinations of different wavelengths may be used for various different markers in a scene, under various conditions, such as fog, and based on a resolution and optical contrast required to produce the data needed by the CG rendering system 126 for animation. For example, active marker light components that emit blue wavelength light may be used for high moisture or water settings. The active marker light component 130 may include one or more light sources, such as an LED or an array of a plurality of LED's (e.g. a bundle of three LED's).

Any frequency of electromagnetic radiation may be selected for an active marker light component to emit. For example, a particular wavelength range of light may be selected within various types of visible light and non-visible light, such as infrared, ultraviolet radiation, etc.

In some implementations, a receptacle 104 may include a multi-band emitter by which the active marker light component 130 within the receptacle may be configured to emit various wavelengths ranges of light at any given time. For example, an active marker light component may include a plurality of light sources that are configured to emit a different wavelength of light. Control signals may be provided, such as via the signal controller 116, control unit 112, or in response to condition sensors on the active marker apparatus, for the active marker light component to emit a particular wavelength of light at one time and to emit a different wavelength of light at a different time. In some implementations, a multi-band emitting active marker light component may emit various wavelengths of light at the same time via different light sources or filters within the active marker light component, e.g. infrared and visible light sources.

In some implementations, the signal controller, control unit and/or receptacle may include a conditions sensor to determine environmental conditions in which a particular wavelength of light is favorable or unfavorable, such as due to interfering environmental lighting. The active marker light component may automatically generate the favorable wavelength of light based on conditions detection by the environmental sensor. One benefit of multiple-band emitters may be when conflicting light is present on a set e.g. environmental light, that interferes with some wavelengths of light of an active marker light component. Multi-band emitters may also provide information about the active markers, such as location, 3-D direction the marker is facing, identification of the active marker and/or object, etc.

In some implementations, a receptacle may house multiple active marker light components in which each active marker light component emits a different wavelength range of light. In some implementations, a strand 108 may include various active marker light components that generate different wavelength ranges of light. In still some implementations, a wearable article 106 may include multiple strands 108, with the various strands devoted to active marker light components emitting a different wavelength range of light than other strands.

The pulsing of light by the active marker light components 130 may be controlled by a signal controller 116 sending signals to a control unit 112 electronically coupled to the strands 108. In some implementations, a pulse rate may be preset and may or may not require a signal controller 116.

A performance capture system 120 includes a sensor device, e.g. a camera configured to capture at least one particular wavelength light from the active marker light components. In some implementations, one or more cameras of the performance capture system 120 may include a visible light filter to block visible light and allow only particular wavelengths of non-visible light to be detected by the sensor device. The sensor device may include various types of cameras, such as a computer vision camera and mono-camera that is sensitive to infrared light (700 nm to 1 mm wavelength light), e.g., that exclude infrared blocking filters.

In some implementations, an image capture device image capture device 114 may also be included to capture visible light, such as a color and/or shape of the receptacles 104. In some implementations, the image capture device 114 and performance capture camera may be synchronized. Data from the image capture device 114 and the performance capture camera may be combined to determine a marker arrangement 122. The performance capture system determines the marker arrangement 122 from data 124 representing positions of the detected markers. The marker data from the image capture device may also be used to match CG parameters for CG images with image capture device parameters, such as perspective, position, focal length, aperture, and magnification, of the CG images. In this manner the CG images may be created in an appropriate spatial relationship with the live action objects.

The performance capture system 120 feeds marker data obtained from the detection of the active marker light components in the receptacles 104 to the CG (computer graphics) rendering system 126 to be mapped to a virtual model using software of the CG rendering system 126. The CG rendering system 126 may represent the data in a virtual environment. For example, computer programs may be used by CG rendering system 126 to overlay information on top of movements of the actor 110 represented by the data.

The CG rendering system 126 may include computer processing capabilities, image processing capabilities, one or more processors, program code storage for storing program instructions executable by the one or more processors, as well as user input devices and user output devices (e.g., animation and rendering components of system 1000 described below with regard to FIGS. 9 and 10).

Signal controller 116 may communicate with control unit 112 to direct the active marker light components 130 to emit light at a particular pulse rate, or may communicate directly with a wireless active marker light component having an onboard receiver. In some implementations, the signal controller 116 emits radio frequency signals to receivers on control unit 112 that is wire or wirelessly coupled to the active marker light components. In some implementations, signal controller 116 may release signals to direct an action by the performance capture system to drive capture at the same time as the pulse of light from the active marker light components. The pulse rate of light emitted from the active marker light component 130 may be in synch with global shutter signals and according to the signal controller 116. For example, the pulse rate may be calibrated to be consistent with the detection camera exposure time so that light is emitted only when the camera shutter is open. The use of a pulse rate rather than constant emitting of light may provide a benefit in reducing energy needs and battery life. The light may not be emitted when a camera shutter is closed and light is undetected.

The active marker apparatus may be placed at a distance that enables receiving of signals by the active marker apparatus from the signal controller 116 and detection of light by the detecting camera, e.g. performance capture system 120 from the active marker light component. For example, the active marker apparatus may be located up to 50 m from the signal controller 116.

Use of the active marker apparatus in the present performance capture system offers benefits over passive-type marker systems, such as increased sensitivity and reduced energy requirements. For example, some systems that employ reflective markers use a camera as a light source, such as a ring light with infrared LED light. The light source on the camera may emit light when the shutter of the camera opens at the time of a synch pulse. The markers have reflective material that reflects the received light back to the camera for detection.

Active markers enable improved detection of light over other reflective marker technology. For example, when using reflective markers in an outdoors scene, environmental light may interfere with detection of the reflected light. The reflected light may decrease with the square of distance. For example, in situations in which a marker is placed at 10 m from a detection camera, assuming 100% of light is reflected, the amount of light reflected may drop off 100 times as it travels to the detection camera. Performance capture systems that use active markers do not experience such extensive distortion of received light.

In addition, the active marker may also use less power than reflective markers. Light emitted from an active marker is only required to travel one way from the marker to the detection camera, rather than the light traveling two-ways from the light source to a reflective marker and back to the camera.

In some implementations, one or more active marker light components 130 may be electronically coupled to strand 108 by one or more wires of the strand extending from the active marker light components. In various implementations, the strand 108 may include one or more wires that run inside the length of a flexible tube or sleeve, e.g. in a conduit in the strand, heat shrink tubing, protective wrap or tape, coating over the wires, etc. Other forms of the strand may be possible for wired communication between the control unit and the active marker light components, e.g. to control pulsing of light be the active marker light component via the control unit, and/or for supplying power to the active marker light components. For example, particular wires may be dedicated for power, control data lines, and ground. In some implementations, the strand may be one or more wires, e.g. bare wires, embedded within a protective material of the wearable article. Further, in still some implementations, the strand may be provided on an exterior surface of the wearable article, rather than underneath, e.g. attached to an interior surface of the wearable article.

In some implementations, wireless active marker light components may be employed that are independently controlled with an on-board input/output interface to receive wireless synchronization signals via a wireless format, such as from signal controller 116 and/or control unit 112. The wireless active marker light component may also include logic. In these implementations, the active marker apparatus may not use a strand for electronical control of or supplying power to the active marker light components. Such wireless active marker light components may be coupled to one or more supportive strands for mechanical attachment of the active marker light component to the receptacle via channels, and not for electronic communication or to provide power. For example, the one or more strands may be non-conductive rigid, semi-rigid, or flexible connectors to the active marker light component, or extensions of the active marker light component, to engage with the channels of the receptacle as described below. In still some implementations, the active marker apparatus that uses wireless active marker light components, e.g., with a self-contained battery source and wireless communication receiver, may exclude a strand.

The visual production system in FIG. 1 is a representation of various computing resources that can be used to perform the process actions and steps described herein. Any number and type of discrete or integrated hardware and software components may be used. The components may be located local to, or remote from the other system components, for example, interlinked by one or more networks.

Figure 2A:
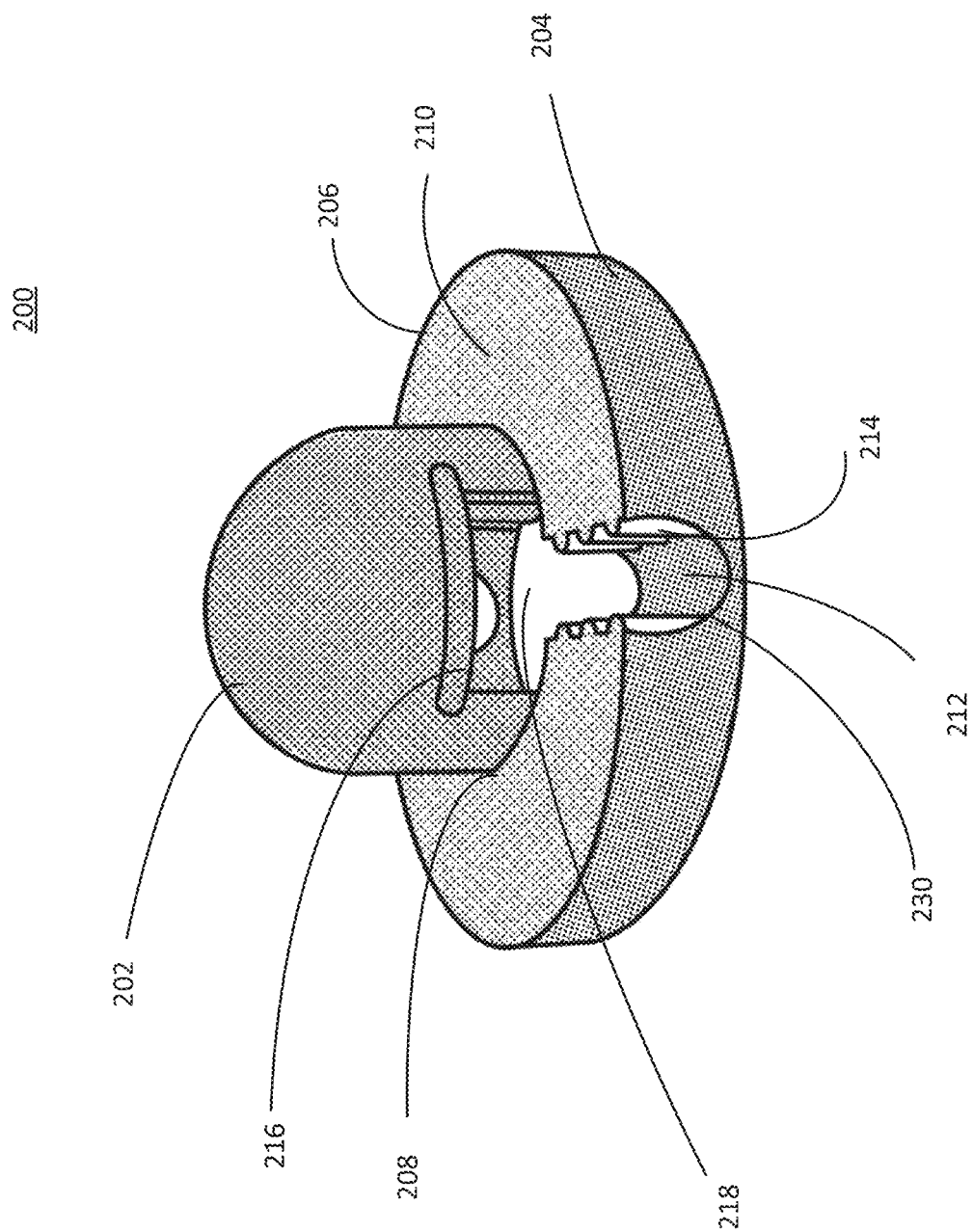
FIG. 2a is a side perspective view of an exemplary receptacle for an active marker light component, in accordance with some implementations.
Figure 2B:
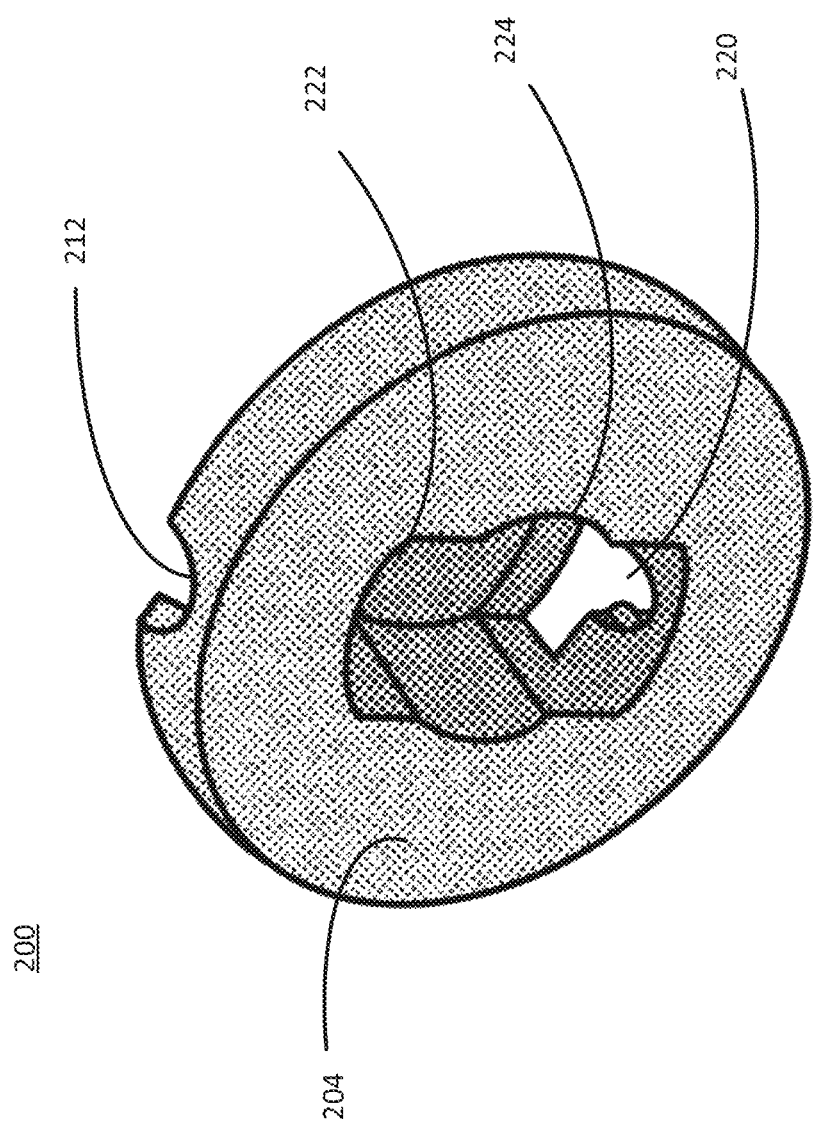
FIG. 2b is a bottom perspective view of an exemplary receptacle for an active marker light component, in accordance with some implementations.

As shown an example in FIGS. 2a and 2b, a receptacle 200 is provided for housing an active marker light component (as in item 130 in FIG. 1) and affixing the active marker light component to a wearable article. In FIG. 2a, a protrusion portion 202 extends from a base portion 204 that has a larger diameter at an outer rim 206 than a diameter of the protrusion portion 202 at the junction 208 between the protrusion portion 202 and the base portion 204 to form a ledge 210. In some exemplary implementations, the diameter of the protrusion portion 202 at junction 208 may be about 10 mm to 20 mm, for example, about 12.6 mm and the diameter at the outer rim 206 may be about 20 mm to about 30 mm, for example about 25 mm. In some implementations, the junction 208 diameter to the outer rim 206 diameter may be about 1:2. Other sizes and ratios are possible to create a ledge 210 sufficient to maintain the base portion of the receptacle underneath the wearable article and the protrusion portion on the outer side of wearable article and, based, at least in part on the stiffness of the material of the wearable article. For example, in cases that material of the wearable article is more rigid, the outer rim diameter may be smaller and where the material is more flexible, the outer rim diameter may be larger.

In some implementations, the thickness of the base portion 204 from the lower side to the ledge 210 is miniscule to maintain a close profile to the wearable article and provide comfort for an actor wearing the active marker apparatus. In some exemplary implementations, the thickness of the base portion 204 is between about 2 mm to 10 mm, for example, about 4 mm. Other thicknesses are possible to provide a close profile and yet provide sufficient rigidity and support for the protrusion portion of the receptacle.

The protrusion portion 202 may be various shapes. Often the protrusion portion 202 may be convex, such as a hemispherical or dome shape. Other shapes are possible, such as other three-dimensional shapes, e.g. prism, cone, cylinder, plateau, etc. that may permit light diffusing from the protrusion portion to be detected by sensors in the live action scene. The shape and size of the protrusion portion may define an interior chamber to fill with light from the active marker light component. The protrusion portion may also provide for controlled disbursement of light, e.g. based on the protrusion portion shape, size and levels of transmissivity of particular surface sections of the protrusion portion. In some implementations, the protrusion portion may be a flat surface that is transmissive to at least one wavelength of light emitted from the active marker light component.

An interior surface of the protrusion portion 202 may define, at least in part, the chamber that creates a gap space between the active marker light component, once inserted, and the interior surface of the protrusion portion 202. In some implementations, the protrusion portion may include various interior walls to define the chamber and direct the light to particular transmissive surface sections of the protrusion portion for radiating of light. In some implementations, the gap may be between about 15 mm to 25 mm, such as about 18 mm. Other gap heights are possible.

The gap allows light emitted from the active marker light component to fill the gap space and diffuse through transmissive section(s) of protrusion portion 202. In some implementations, the entire protrusion portion is transmissive, increasing a directional range to detect the light. For example, light emitted from an active marker light component lying flat on or under the surface of a wearable article without the protrusion portion of the receptacle, may be detectable within only a limited field of view, such as about 60 degrees of view. With the use of the gap in the protrusion portion such as a dome-shaped protrusion, for example, the angle of detection may increase to beyond 180 degrees, such as 270 degrees or more. The ability to detect light from the active marker light component from a variety of angles to the performance capture camera assists in live action shoots in which an actor moves in various ways with respect to the camera position. Without the increase angle of detection and with a limited range of visibility, the sensor devices (e.g. cameras) may need to remain in front of the object and active marker light components to detect the light.

The entire surface of the protrusion portion may be transmissive to any type of light and providing a maximum viewing area to detect light coming from the active marker light component. The active marker light component may include one or more light sources dedicated to particular wavelengths of light and/or include one or more filters that limit the wavelength of light being exposed to the chamber and diffused from the protrusion portion.

The protrusion portion may also be selectively transmissive to the wavelength of light coming from the active marker light component and non-transmissive to other wavelengths of light. Thus, the protrusion portion may serve as a filter to different wavelengths of light being passed through the receptacle and which the sensor device detects. In this manner, light sources that emit wide bands of wavelengths of light, e.g. white light emitting diode (LED) with red, green, blue emittance (RGB), may be employed and the light filtered for specific wavelengths by the protrusion portion.

In some implementations, e.g. where a different detection area of light is desired, such as a concentrated narrow point of light, the protrusion portion may have a different shape resulting in various sizes of gap in the chamber, including no gap. In some implementations, one or more dedicated surface sections of the protrusion portion may be transmissive to the light from the active marker light component and other surface sections being opaque and impenetrable to the light. The dedicated surface sections may be shaped and sized to create a particular spread of light for specific sensor devices to capture. Certain shapes of viewing areas may further enable the performance capture system to distinguish between particular active markers having different viewing area shapes and/or differentiate the active markers from background light. Particular shapes of sections of the protrusion portion may further be used to direct light away from potentially interfering sources, such as reflective surfaces on the wearable article or the object, e.g. eye glasses.

In some implementations, the receptacle may further include a focusing component, a defocusing component or various filters to control how the light is dispersed from the protrusion portion.

In some implementations, multiple surface sections may be provided on a protrusion portion having transmissivity to different wavelengths of light, thus accommodating a multi-band active marker light component that is configured to emit various wavelengths of light. For example, a first section of a protrusion portion may be transmissive to infrared light and a second section may be transmissive to ultraviolet light. In this manner, sections of the protrusion portion may provide filtering effects for different types of light. Dedicated sensor devices may be configured, e.g. with filters, to capture the different wavelengths of light.

In some implementations, certain receptacles may release a first wavelength of light in one direction (e.g. forward) from a section of the protrusion portion and a second wavelength of light in a different direction (backward) of the protrusion portion. Such split receptacles may be used to determine an orientation of the active marker by sensor devices capturing the distinct lights coming from different directions of the receptacle.

The protrusion portion, or particular sections of the protrusion portion, may be composed of a material that is transmissive to a particular range of wavelengths of light that is emitted from the active marker light component, such as transparent and/or translucent material. For example, the receptacle may be a 3-D (3-dimensional) printed part made of a plastic resin that may include a translucent or transparent color. In some implementations, the material is transmissive to infrared wavelength light, such as near-infrared light. In some implementations, the material transmits light in a range of about 750 nm to 1 mm wavelength, particularly 750 nm to 2500 nm, and more particularly 800 nm to 900 nm, such as about 850 nm. In some implementations, the protrusion portion may be transmissive to a range of blue wavelengths of light. Other wavelengths are possible depending on particular conditions of the shoot. The transmissivity of a particular wavelength or range of wavelengths of light by the protrusion portion depends, at least in part, on the wavelength(s) of light emitted from the active marker light component inserted into the respective receptacle.

The base portion 204 may include one or more channels 212 to receive the strand coupled to the active marker light component, once the active marker light component is inserted into the receptacle through slot 218. The channel 212 may be sized to snuggly fit the strand and discourage movement of the active marker light component coupled to the strand. In some exemplary implementations, the channel may be about 1 mm to 5 mm wide, for example, 2 mm wide, and about 2 mm to 6 mm deep, for example 3 mm deep. The channel may extend through the length of the ledge of the base portion 204, such as 5.0 mm to 8.0 mm for example about 6.2 mm in length. Other channel dimensions are possible based on the diameter of the strand and materials to permit the strand to be inserted within the channel and to restrict movement of the active marker light component and strand once inserted.

In some implementations, the base portion 204 may include two opposing channels 212, an entrance channel extending from an entrance end of the channel at an exterior port 230 of the receptacle to a first interior location in the receptacle that is proximal to a placement position for the active marker light component, e.g. proximal to the bottom area of the chamber. An opposing exit channel may extend from a second interior location proximal to the placement position for the active marker light component to an exit end at another exterior port 230 (not shown). For example, the interior locations may be a platform or other surface upon or over which the active marker light component rests when installed into the receptacle.

In some implementations, the entrance channel and exit channel may be positioned at opposite ends (180 degrees apart), such as mirror images of each other. In other implementations, the entrance channel and exit channel may be positioned at different angles with respect to each other, such as 90 degrees, 45 degrees, etc. The channels may be slanted between the entrance/exit ends of the channel and a placement cavity for the active marker light component (such as 522 in FIG. 5c described below). For example, two opposing slanted channels may be slanted in the same direction at less than a 90 degree angle from each other to create an angled pathway, e.g. a loop, in which the strand enters and exits the receptacle.

In some implementations, the channel includes resistance elements, such as one or more bumps 214 that are configured to engage with the strand and hinder movement of the strand. A snug fit of the strand within the channel immobilizes the strand and the coupled active marker light component, preventing displacement within the receptacle. The bumps 214 may be vertical ridges that line the interior of the channel sidewalls. The bumps on each sidewall may be in alternating positions or aligned with corresponding bumps on the opposing sidewall. In some implementations, the bumps 214 may be located in various placements inside of the channels, such as horizontal bulges on the floor of the channel. The bumps 214 may be any shape or size to reduce slippage of the strand, such as a channel ridge. In some implementations, the resistance elements may include a corrugated surface of the channel, a rough material, and other surface textures that may assist in restraining the strand within the channel.

Slot 218 of the protrusion portion 202 may be sized and shaped to receive the active marker light component and strand strung through the slot 218 to the interior of the receptacle. In some exemplary implementations, the slot may be about 5 mm to 8 mm wide, for example, 6.5 mm wide and about 1 mm to about 4 mm high, for example about 2.6 mm high. Other slot sizes and shapes are possible based on the size and shape of the active marker light component to allow for insertion of the active marker light component coupled to the strand. In some implementations, the receptacle may include two slots 218 at opposing positions above the internal channels for stringing the strand into and out from the receptacle with the active marker light component positioned within the interior of the receptacle.

In some implementations, the protrusion portion includes one or more ridges 216 configured to engage a groove of the cap fitting, as described below in FIGS. 4a and 4b. In some implementations, at least two ridges 216 are spaced in opposing positions on the protrusion portion 202. The ridge 216 may be an elongated shape that rotatably engages a similarly-shaped groove of the cap fitting. Other shapes of ridge 216 are possible for securing the cap fitting to the protrusion portion. In some implementations, the protrusion portion 202 includes one or more grooves that engage one or more ridges of the cap fitting.

As shown in a bottom side view in FIG. 2b, in some implementations, the base portion 204 of the receptacle 200 includes a bottom alignment cavity 220. The alignment cavity 220 may serve as a pocket for the active marker light component to rest for proper placement of the active marker light component within the receptacle. The alignment cavity 220 may be an elongated shape with narrow end sections 222 and a wider center section 224 for convenient positioning of the active marker light component and the strand feeding into opposing channels 212. Other sizes and shapes of the alignment cavities are possible based on the size and shape of the active marker light component and strand. In some implementations, the alignment cavity 220 may be an indentation in the base portion 204 or platform, rather than an opening through the base portion 204.

Figure 3:
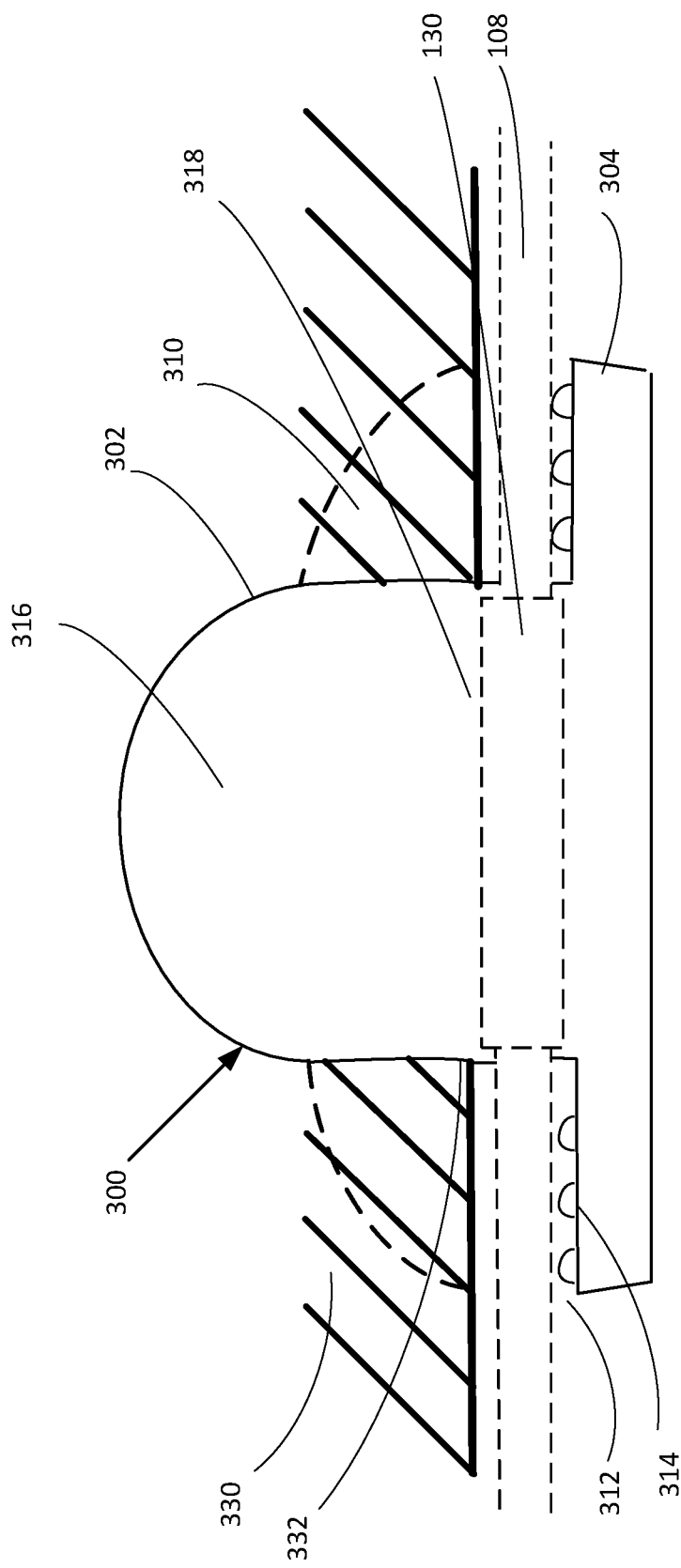
FIG. 3 is a cutaway side view of a receptacle installed in a wearable article, in accordance with some implementations.

As shown in a cutaway view of an installed receptacle 300 in FIG. 3, the receptacle 300 may be configured to be inserted from the underneath of a wearable article 330. The receptacle 300 is configured to hold the active marker light component 130 at a bottom area 318 of a chamber 316 of a protrusion portion 302. The protrusion portion 302 may be pushed through an opening 332, e.g. a hole, in the wearable article 330 and the base portion 304 may remain in the underneath side of the wearable article 330. The opening 332 is sized to receive the protrusion portion 302 and restrict the base portion 304 coupled to the protrusion portion 302, from being received in the opening 332. For example, opening 332 may be the same as, or substantially the same as, the diameter of the protrusion portion 202 at junction 208 as shown in FIG. 2a, such that the protrusion portion may be snuggly inserted through the opening 332. From underneath the wearable article 330, the ledge 310 butts against an inner side of the wearable article 330 that may define the opening 332. The base portion includes two opposing channels 312 having a plurality of bumps 314 to engage with the strand 108 electrically coupled to the active marker light component 130. The strand may be pulled or pressed downward from the slots (e.g. 218 in FIG. 2a) to reside within the channels 312.

As shown in FIGS. 4a and 4b, a cap fitting 410 may be provided as a component of the receptacle 400 to secure the receptacle to a wearable article. When the receptacle is attached to a wearable article, the cap fitting 410 is mounted around the protrusion portion 402 in FIG. 4b, as shown by dotted line A-B, on the exterior of the wearable article. The cap fitting 410 presses against the wearable article at the base portion (204 in FIG. 2a) to hold the base portion against the wearable article. Cap fitting 410 may include a locking mechanism, such as one or more grooves 418 to rotatably engage a corresponding one or more ridges 416 of the protrusion portion 402 e.g. in a cam lock type mechanism, as shown in FIG. 2a. Other cylindrical fasteners or locking mechanisms are possible to secure the cap fitting to the protrusion portion of the receptacle. The cap fitting 410 may also include one or more channel markings 414 to indicate the location of the channel 412 of the receptacle 400, as shown in FIG. 4b.

In some implementations, the outer surface of the cap fitting may be beveled with a slope toward the outer diameter of the cap fitting. The beveled surface may reduce sharp edges that may get caught onto surfaces that the cap fitting may brush against and may also provide esthetic appeal.

In FIG. 4b the cap fitting 402 may be snugly mounted onto the receptacle 400. The cap fitting 410 may be configured to prevent the base portion 404 from pushing through to the outer side of the wearable article. In some implementations, the diameter of the cap fitting 410 may be the same, or substantially the same, as the diameter of the base portion 404.

In some implementations, the cap fitting 410 may also serve as a physical marker for additional active marker tracking and/or identification of particular active markers. The cap fitting 410 may include a color detectable by a visible light camera. The cap color, e.g., orange or yellow, of the cap fitting 410 may be distinct from a color of the wearable article near the location of the receptacle. Use of distinct colors, such as contrasting colors (or complementary colors, at or near opposite ends of a color wheel) and intensity of the color of the cap fitting 410 may enhance detection of the cap fitting 410. In some implementations, the cap color may be a dominant hue and/or saturated color. The color may also include a glow-in-the-dark substance, such as phosphor, or other substance that enables night time visibility. In situations in which there is sparse coverage of infrared light detectable from the active marker light component, visible light detection can assist in tracking the receptacle. In still some implementations, the cap fitting may be a muted color that blends with the color of the wearable article.

In some implementations, the shape of the cap fitting 410 may be used by a visible light camera for detection, instead of, or in addition to a distinct color of the cap fitting 410. For example, the cap fitting may be a ring shape and the image capture device may detect items in the scene that have the particular ring shape.

In some implementations, the cap fitting 410 may include an opaque color and/or material to concentrate diffusion of the active marker light at the protrusion portion of the receptacle. The opaque-type cap fitting 410 may assist in blocking the light emitted by the active marker light component, from seeping through other areas of the receptacle, e.g. base portion, and through the wearable article. In this manner, an opaque cap fitting may enable a defined path for the light through the protrusion portion for precise detection of the light by the performance capture system.

In some implementations, a crack 420 may be formed between the base portion 404 of the receptacle 400 and the lower side of the cap fitting 410 to provide space that accommodates the wearable article to fit between. Channel markings 414 may indicate locations of the interior channels. Channel markings may include raised surfaces on the ledge of the base portion 404.

Figure 5A:
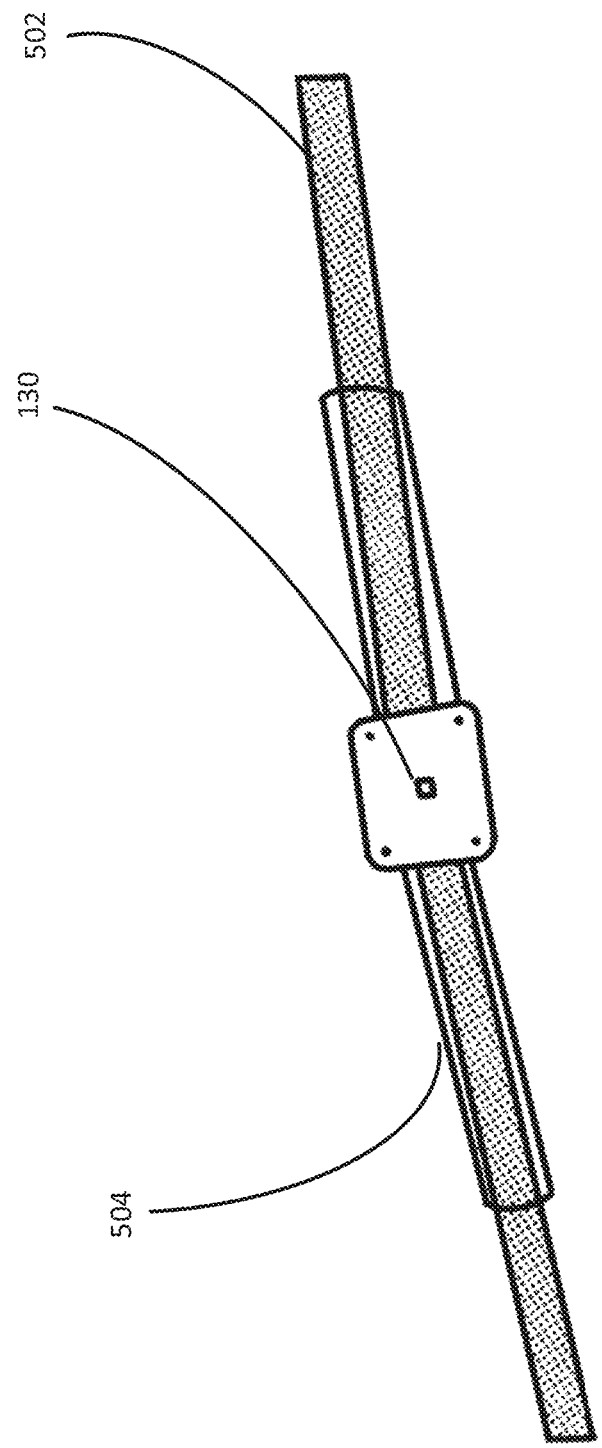
FIG. 5a is a top view of an exemplary active marker light component and strand, in accordance with some implementations.

As shown in FIG. 5a, an active marker light component 130 is coupled to a strand 502. A protective covering 504, e.g. heat shrink tubing may cover internal wires at an area of the strand in which the active marker light component is attached to the strand and the general area of the receptacle once the active marker light component is inserted into the receptacle. The protective covering 504 may serve to insulate, protect and seal the active marker light component 130 with the strand 502. The strand is configured to maintain a low profile with the wearable article. The strand typically includes a flexible material. The strand may contain an encased wire or may be a naked wire. The wire typically includes a highly conductive element, such as copper, silver, gold, or aluminum, and may be uncoiled, stranded, solid, braided, etc. The strand may provide a pathway for electronic communication between various components of the active marker apparatus. For example, the strand may be a conduit of electrical signals between components and/or provide a supply of power, such as from/to one or more control units and active marker light components, between the active marker light components within a group, and/or between groups of active marker light components with other groups of active marker light components.

The active marker light component 130 may include one or more light sources, such as an LED or an array of a plurality of LED's (e.g. a bundle of three LED's). A plurality of active marker light components 130 may be coupled to the strand 502, such as 2 to 15, for example, 8 active marker light components on a strand.

Figure 5B:
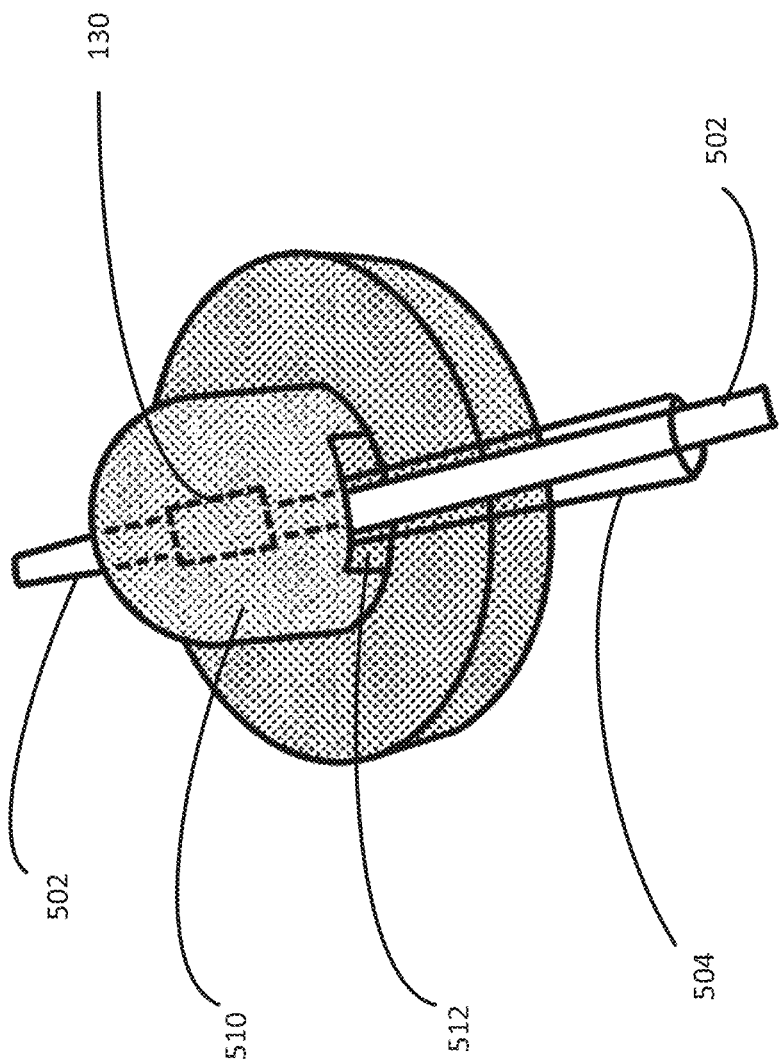
FIG. 5b is a side view of an exemplary active marker strand coupled with a marker receptacle, in accordance with some implementations.

As shown in FIG. 5b, an active marker light component 130 coupled to strand 502 is inserted into slot 512 of receptacle 510. Strand 502 extends from a point of entrance (such as exterior port 230) in the receptacle 510 and further continues through an exit point (such as exterior port 230) out of the receptacle 510. The protective tubing 504 covers a portion of the strand adjacent to active marker light component 130 to a portion of the strand that extends outside of the receptacle 510, e.g. 12 mm to 25 mm from the receptacle.

Figure 5C:
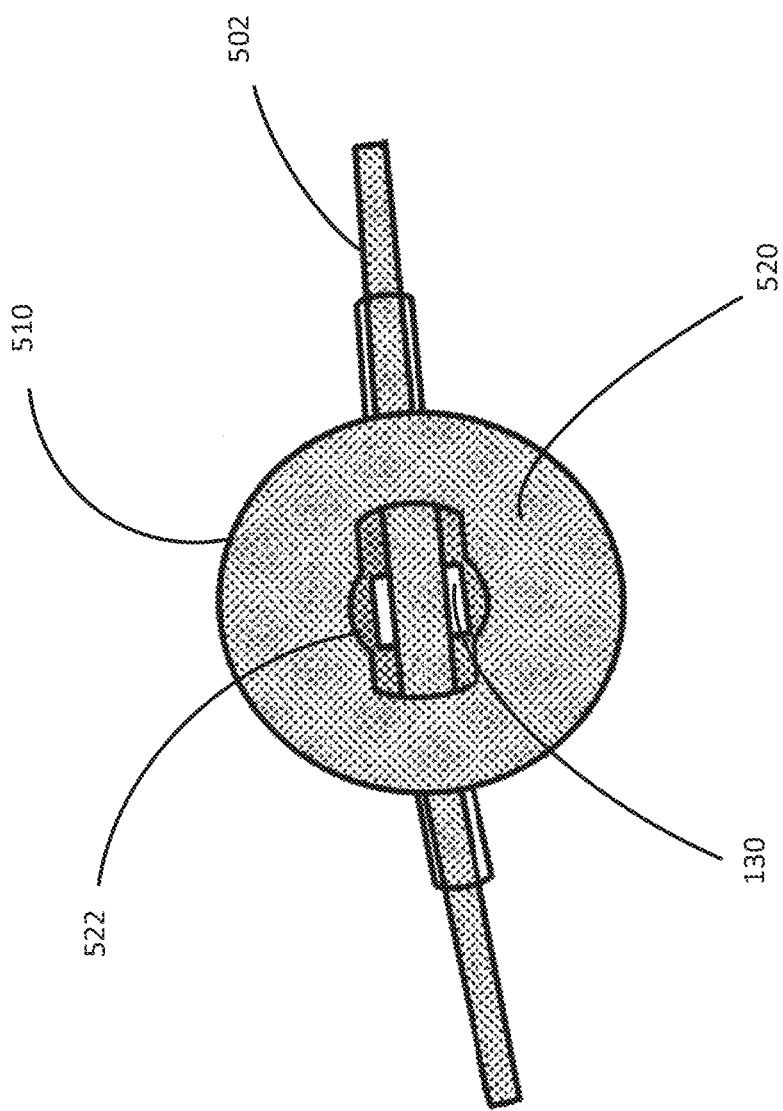
FIG. 5c is a bottom view of an active marker strand coupled with a marker receptacle, in accordance with some implementations.

FIG. 5c is a bottom view of the receptacle 510 with the strand 502 and active marker light component 130 installed in the receptacle 510. The active marker light component 130 may be positioned over a placement cavity 522 in the base portion 520 of the receptacle 510.

Figure 6:
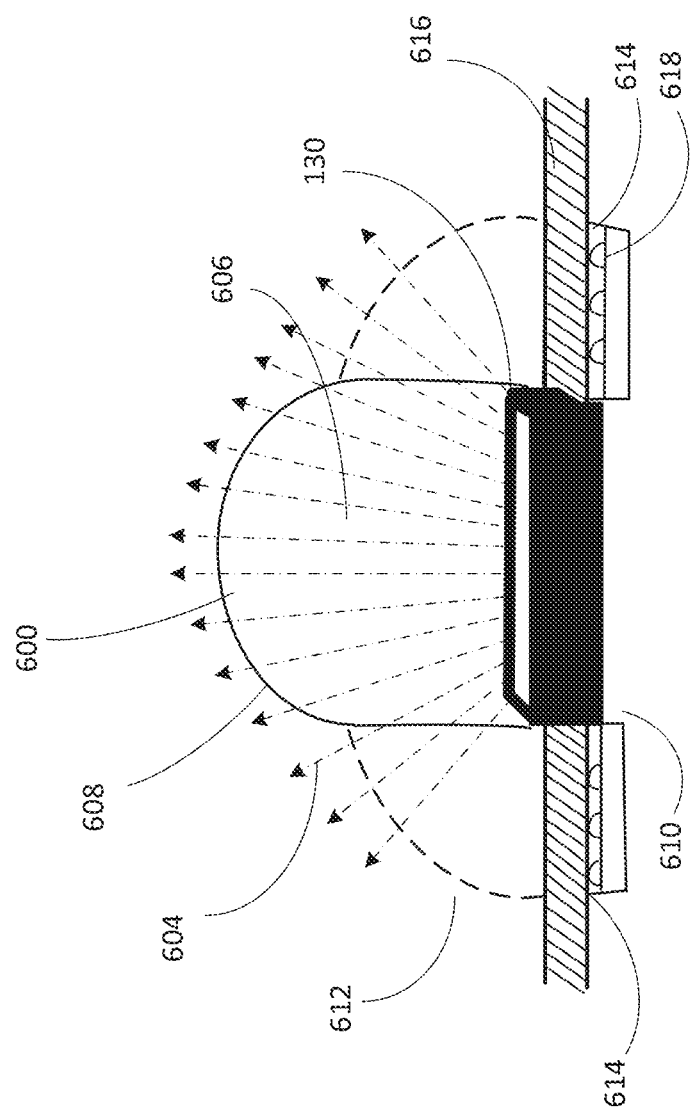
FIG. 6 illustrates an exemplary cutaway side view of a receptacle with an active marker light component that emits light, in accordance with some implementations.

As shown in FIG. 6, an exemplary cutaway side view of a receptacle 600 is provided in which the receptacle 600 houses an active marker light component 130 that emits light 604 from a bottom of an internal cavity 606 and through walls of a protrusion portion 608 of the receptacle 600. When in use, the light 604 diffuses into a live action scene for detection by one or more sensors, e.g. cameras, configured to detect the particular wavelength range of the light 604. The active marker light component 130 sits in an alignment cavity 610 of a base portion 612 of the receptacle 600. Entrance and exit channels 614 hold the strand 616 as the strand engages with bumps 618 of the channels 614.

Example Apparatus on a Wearable Article

Figure 7A:
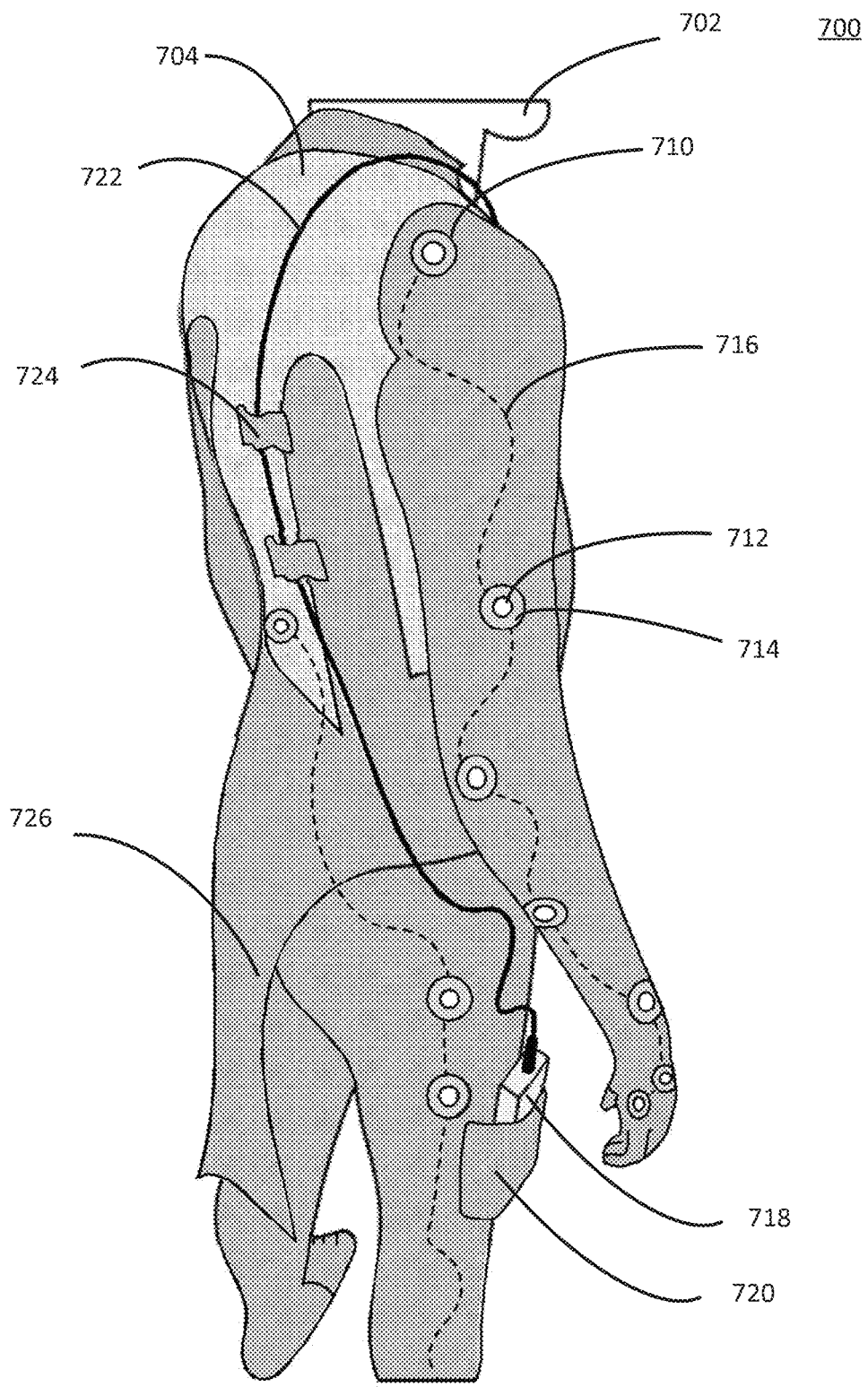
FIG. 7a illustrates of exemplary active marker strands attached to clothing of an actor, in accordance with some implementations.

As shown in FIG. 7a, the active marker apparatus 700 may be internally worn on a suit 702 of an actor 704. Multiple active marker receptacles 710 may be attached to predetermine positions in holes on the suit. A protrusion portion 712 juts out from a hole in the suit 702 and a cap fitting 714 may be locked around the protrusion portion 712. In some implementations, the cap fitting 714 may be rotated about 90 degrees for ridge to groove engagement.

The active marker receptacles 710 may be coupled in groups onto strands 716 underneath the suit 702 (shown as dotted lines in FIG. 7a). In some implementations, one or more individual strands may be devoted to a particular appendage of the suit 702, e.g. arm area and leg area. The coupling of a group of active marker light components to a strand enables quick attachment to the wearable article as the strand may be conveniently rolled out and each active marker light component in the group threaded through the suit. In some implementations, the strand may also be tucked into passageways in the wearable article, providing for additional securing of the active marker apparatus to the wearable article. In some implementations, various strands may include different types of active marker light components. Strands on the top of the suit from the torso area upward may include active marker light components emitting a particular wavelength of light, which may be different from the active marker light emitted from strands on the bottom below the torso. For example, in some production shoots in which an actor may walk in water, the bottom strands may be sealed active marker light components emitting a blue wavelength light, whereas the active marker light components in top strands emit infrared light. Different sensor devices may be devoted to particular wavelengths of light from different active marker light components.

In some implementations, the strands 716 may be electrically coupled to and extend from a control unit 718 that may reside in a pouch 720 in the suit. In some implementations, the control unit 718 may be moveable to various pouches in the suit 702 or strapped to the suit. If the actor 704 is required to move for a shoot in a manner that may damage the control unit, the control unit may be relocated to another pouch in a different part, e.g. from the leg area to the upper back area of the suit 702. The control unit 718 may be secured in the pouch 720 with by a pouch closure such as a zipper, strap, buttons, hook and loop, etc. The pouch may be configured e.g., lined with supportive material, to support the control unit so that the weight of the control unit does not affect the fit of the wearable article, such as by making the suit sag.

The control unit may also include a receiver and/or transmitter for receiving and/or sending signals from/to a signal controller (such as item 116 in FIG. 1). For example, the control unit 718 may receive syncing signals that dictate the pulsing of the active marker light components. In some implementations, different signals may be received for particular strands, so that individual strands or groups of strands may pulse at a different rate. In some implementations, the pulsing control may be according to a pre-determined phase lock that is synchronized with the detection cameras.

In some implementations, the control unit 718 may transmit status signals back to a receiver, e.g., signal controller. For example, status signals may indicate battery levels, active marker failures, or other warnings. In some implementations the control unit 718 may include recording mechanisms to record active marker data, such as facial data. Such data may be transmitted to a receiver for use in the performance capture system.

In some implementations, the strand may be coupled to the wearable article by a variety of fasteners 724, such as hook and loop, snaps, straps, flaps, adhesives, or the strand may be directly sewn onto the wearable article. In some implementations, no fasteners may be provided to adhere the strand to the wearable article. In still other implementations at least some of the strand may be fastened to the exterior surface of the wearable article rather than underneath the wearable article. The strand may include a cable segment 722 coupled to the control unit. The cable strand segment may be thicker than the strand segments that connect the receptacles to each other.

In some implementations, the wearable article may also include a flap 726 of an area of the wearable article for example, a torso area of the suit as shown in FIG. 7. The flap 726 may detachably cover the control unit and/or cable segment(s) of the strand to provide an additional layer of protection. The flap 726 may be permanently (or semi permanently) attached, e.g. via sewn thread, to the wearable article at one or more sides of the flap 726 and be releasable, e.g. via detachable fasteners, from the wearable article at one or more other sides. The flap 726 may be released to expose the control unit and/or cable segment of the strand, for example, to make adjustments to the active marker apparatus, and reattached to the wearable article, e.g. torso area of the suit, during the production shoot.

Figure 7B:
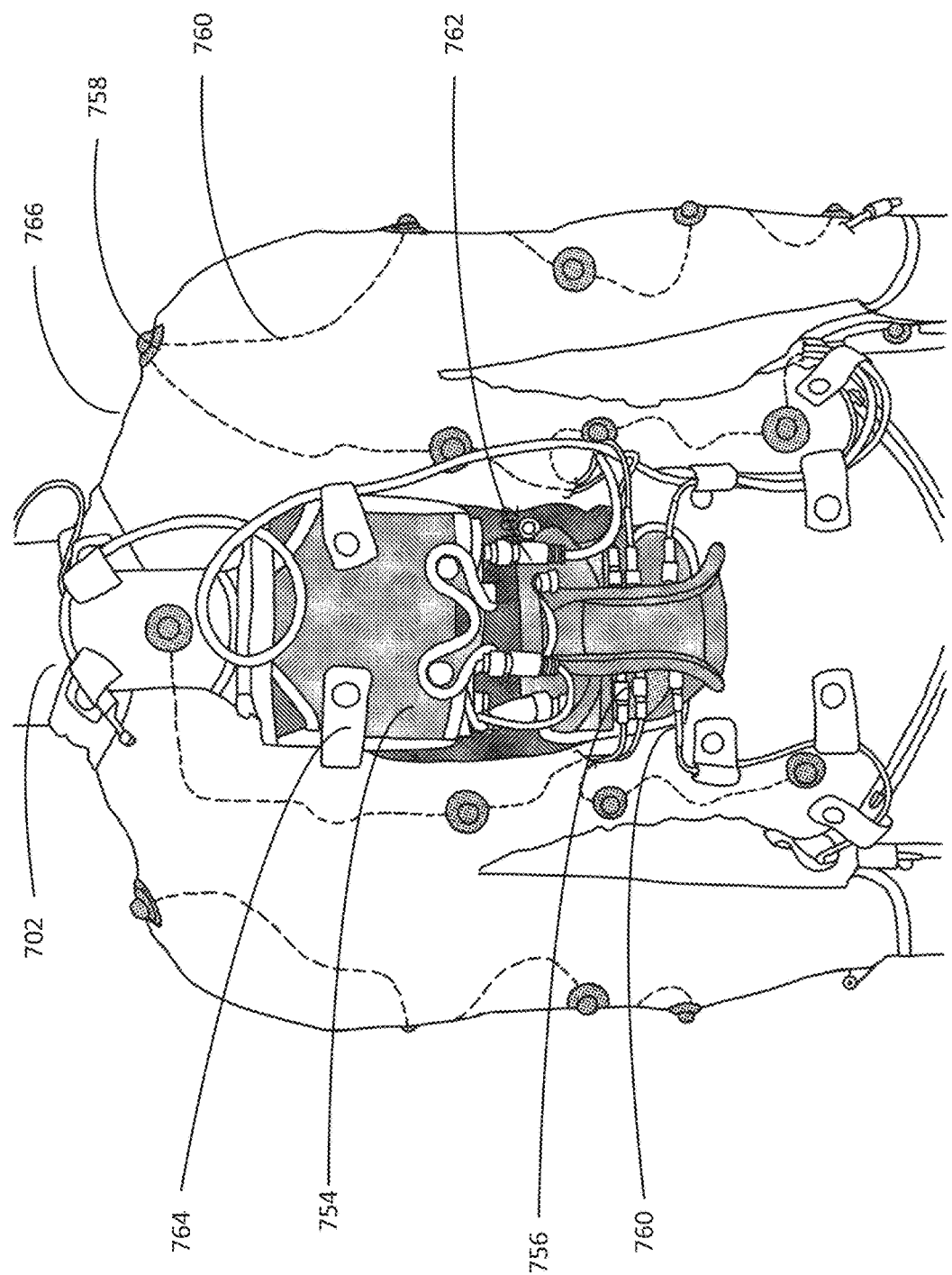
FIG. 7b is a rear perspective view diagram of an actor wearing a control unit on the back of the actor, in accordance with some implementations.

FIG. 7b shows an example of a control unit 754 on the back of an actor 702. The control unit 754 includes multiple strand connectors 756 to couple strands 760 to the control unit 754 and to communicate with active markers 758. The example in FIG. 7b shows six strand connectors 756 attached to six strands of active markers extending to various parts of the actor 702 from the control unit 754. The control unit 754 further includes one or more transceiver connectors 762 to couple one or more cables to the transceiver.

The control unit may also include a receiver and/or transmitter for receiving and/or sending signals from/to a signal controller (such as item 116 in FIG. 1). For example, the control unit 754 may receive syncing signals that dictate the pulsing of the active marker light components. In some implementations, different signals may be received for particular strands, so that individual strands or groups of strands may pulse at a different rate. In some implementations, the pulsing control may be according to a pre-determined phase lock that is synchronized with various sensor devices (e.g. cameras).

In some implementations, the control unit 754 may include a power source, such as a battery unit, to supply power to the control unit and various other components, such as the for the active marker light components through the strands. The power source may be replaced as needed when the energy runs low by detaching the power source and/or control unit from the strands and wearable article In this manner the object, e.g., actor, need not remove the wearable article in order to change the power source. For example, the power source may last about 2 to 6 hours, such as about 5 hours. Various types of batteries may be employed with different capacities. In some implementations, the control unit may have dedicated power supplies for each strand or for collections of strands. In some implementations, the active marker light components may each have its own dedicated power source, which may supplement or replace a control unit power unit.

In some implementations, the control unit 754 may include also include an onboard computing device with logic to perform various functions, such as copy a clock signal, interpret information from the received signals, identify key sequences, turn markers on and off, read battery status, set brightness levels, detect issues with the markers, record data, etc. In some implementations the control unit 754 may include recording mechanisms to record active marker data, such as facial data. Such data may be transmitted to the data capture system via the transceiver.

In some implementations, the control unit 754 may transmit status signals back to a receiver, e.g., signal controller. For example, status signals may indicate battery levels, active marker failures, or other warnings. In some implementations the control unit 754 may include recording mechanisms to record active marker data, such as facial data. Such data may be transmitted to a receiver for use in the performance capture system.

The control unit 754 may further include other components for using signals received through the transceiver and to send data through the transceiver, such as an analog to digital converter, amplifier, modulator, etc. The control unit 754 may be secured to the actor 702 through various fasteners 764, such as snaps, straps, a pouch in the wearable article 766, zippers, etc.

Example Method of Use on a Wearable Article

Figure 8:
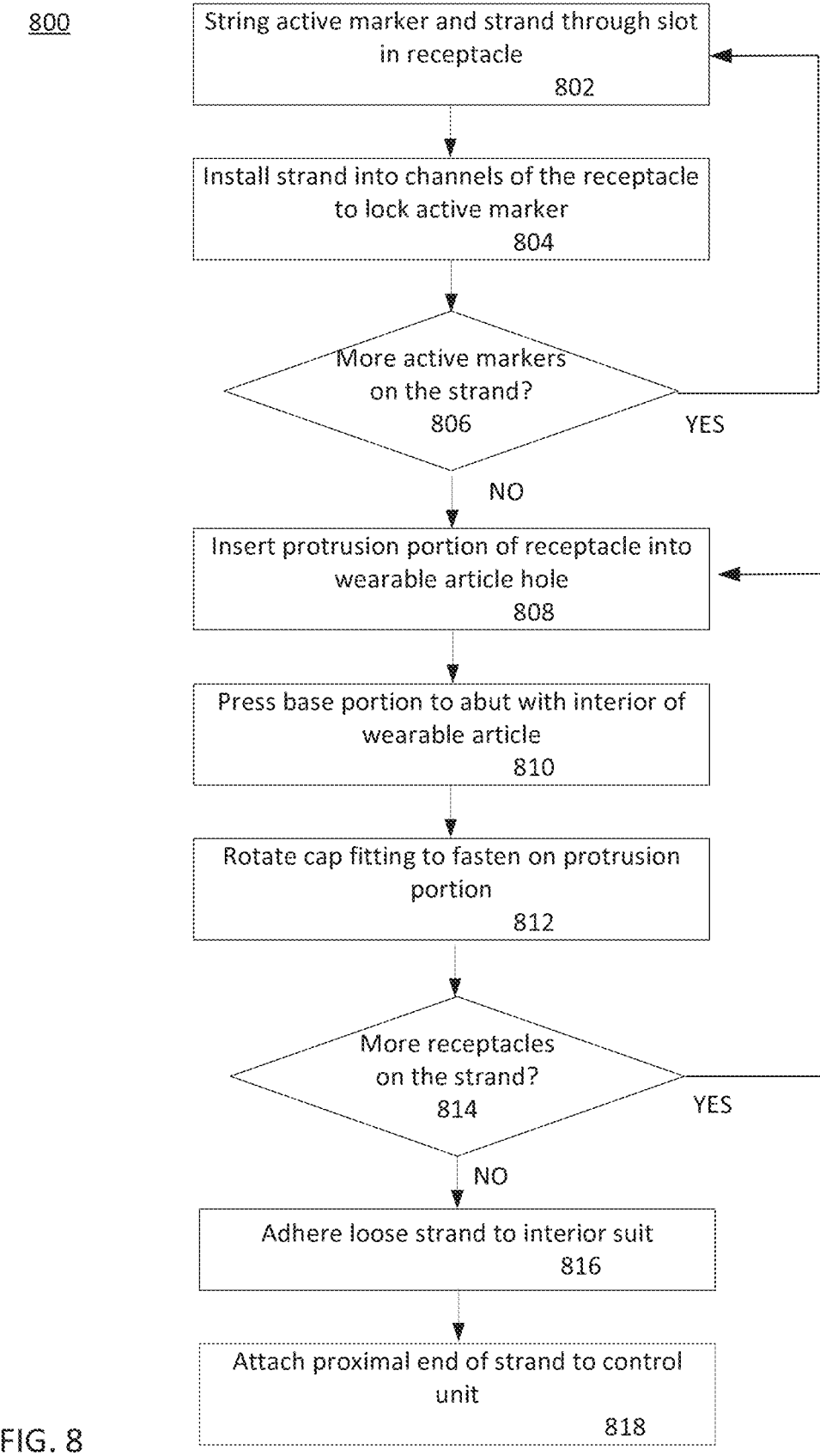
FIG. 8 illustrates an example of an active marker light component installation flowchart, in accordance with some implementations.

In some implementations, the active marker apparatus may be pre-rigged onto the suit prior to an actor putting on the suit. As shown by the flowchart in FIG. 8, an exemplary method 800 of installing an active marker light component and receptacle is described. One or more receptacles (such as 200 in FIGS. 2a, 2b, 300 in FIG. 3, and 400 in FIG. 4b) are provided for one or more active marker light components grouped onto one or more strands. The active marker light component may be attached to the strand and electrically coupled to an interior wire of the strand. In block 802, one of the active marker light components coupled to a strand may be inserted into a slot on a protrusion portion of a respective receptacle by leading a distal end of the strand through the slot so that the active marker light component sits in the alignment area. A segment of the proximal end of the strand from the active marker light component is partially inserted through the slot to allow the active marker light component to be positioned in the alignment area, and a remaining segment remains outside of the receptacle. In some implementations, a distal end of the strand is continued to extend from a second channel through another slot to extend away from the receptacle. In this manner part of a distal segment of the strand remains inside the receptacle and another part of the distal segment is fed outside of the receptacle. Where a strand includes multiple active marker light components, some of the active marker light components may be threaded through a target receptacle with the strand until the particular active marker light component for insertion into the target receptacle is reached. The strand is engaged into the channels to secure the particular active marker light component into the target receptacle, as described in block 804.

The proximal and distal segments of the strand may be at 180 degrees from the active marker light component, to create a straight line. Other configurations are possible in which the strand is at various angles, e.g. 90 degrees, leading to and away from active marker light component. In the case of an angled strand, the respective marker includes similar slanted channels at angles that correspond with the strand and with corresponding entrance/exit slots.

In block 804, the strand may be locked into the receptacle by engaging the strand into the respective channels of the receptacle, such that the active marker light component is securely positioned in the bottom of the chamber of the receptacle thereby forming a gap between the active marker light component and protrusion portion. For example, the strand jutting out of the opposing slots may be pressed down into the opposing channels to firmly fit within the channels. The distal segment of the strand may be engaged with an exit channel and the proximal segment of the strand may be engaged with the entrance channel.

In decision block 806, it is determined whether there are more active marker light components on the strand being handled. If there are more active marker light components on the strand to string into receptacles, the process returns to block 802 to string the next active marker light component on the strand through the next receptacle. If there are no more active marker light components on the strand, the process continues to insertion of the receptacle.

In block 808, the protrusion portion of a receptacle is inserted into wearable article hole 808. The protrusion portion may be introduced from the interior of a wearable article at an inner side of the wearable article, and into a respective hole (also referred to as an "opening") in the wearable article to a position on an outer side of the wearable article, such that the protrusion portion sticks out of the respective hole to the exterior of the wearable article. In block 810 the base portion of the receptacle may be pressed to abut against an inner side of the wearable article. In some implementations, the active marker light component may rest in an alignment area, e.g. a cavity or platform, in the base portion and sit below the surface of the wearable article, e.g. fabric.

In some implementations, in block 812, a cap fitting is placed around the protrusion portion and rotated to fasten onto the protrusion portion. In some implementations, the cap fitting may be fastened to the protrusion portion in other manners, such as snapped, stuck, e.g. with hook and loop, etc.

In decision block 814, it is determined whether there are additional receptacles on the particular strand being attached. If there are more receptacles, the process returns to block 808 to insert the protrusion portion of the next receptacle into a next hole in the wearable article. Otherwise, if there are no more receptacles, the process continues to block 816 to adhere loose sections of the strand to the interior of the suit, for example sections of the strand between attachments to receptacles. The internal surface of the suit may include internal passageways that can receive the strands.

In block 818 the proximal end of strand may be attached to a control unit that may be inserted into a pocket on the wearable article, such that the strand and active marker light components are in electrical communication with the control unit. In some implementations, the control unit may be in previously positioned onto the wearable device and the strand may then be connected to the control unit after attaching the receptacles and strand to the wearable article. In other implementations, the strand may be previously connected to the control unit, such that the control unit and strand are placed into position in the wearable device as one unit.

In some implementations, the strand and active marker light component are attached to the wearable article in manner that minimizes pulling of the strand during actor movement and reduces restriction of movement by the actor, which may be otherwise caused by the active marker apparatus. At times, an active marker light component may be positioned at or near a joint area of the wearable article that correspond with a joint (e.g. knee, elbow, wrist, ankle, etc.) of an actor (e.g. person or animal) or other mechanically moving object (e.g. robot). In this circumstance, the strands may be positioned with a side approach to the joint area, e.g. to wrap around the joint area, rather than extend in a vertical direction through the joint. For example, the strand may extend to the receptacle and active marker light component positioned at the joint area from a side area of the wearable article and extends away from the active marker light component/receptacle back to the same side area of the wearable article. In this example, where the joint area of the wearable article corresponds with a knee joint, the strand may be positioned along an outer side area of a leg area, extended to the knee joint area where an active marker light component may be positioned and be further continued back along the outer side area of the leg area. In some implementations, the receptacle may include slanted channels to create an angled pathway for the strand.

The active marker apparatus, including the active marker light components and strands may be configured to be removable from the wearable article, for example, after a production shoot or for quick repairs, cleaning, or replacement during a shoot. The receptacles may be released from their respective positions by unlocked the cap fitting from the ridge to groove engagement by rotating the cap fitting in a counter direction from the locking direction. The protrusion portion may be guided out of respective openings in the wearable article. The active marker light components with strands may be slid out of the respective receptacles and the receptacles detached from the wearable device. The strands may be detached from any fasteners that may be attaching the strands to the wearable article. The control unit may be also removed from its location on the wearable article, e.g. a pouch and the active marker light components/strands may be disconnected from the control unit. The various components of the active marker apparatus may be available for reattachment to the same wearable article or a different wearable article.

Although the steps may be presented in a specific order, this order may be changed in different particular implementations. For example, in some implementations, the receptacles may be inserted into the wearable article prior to stringing the active marker light component to the receptacle. In some implementations, the proximal end of the strand may be coupled to the control unit prior to some or all of the other steps. In some implementations, the strand may consist of attachable sections, e.g. each section including an active marker light component, and the strand sections may be attached end to end to install the active marker light components within the respective receptacles. In some particular implementations, multiple steps shown as sequential in this specification can be performed at the same time.

Example Computer System

Figure 9:
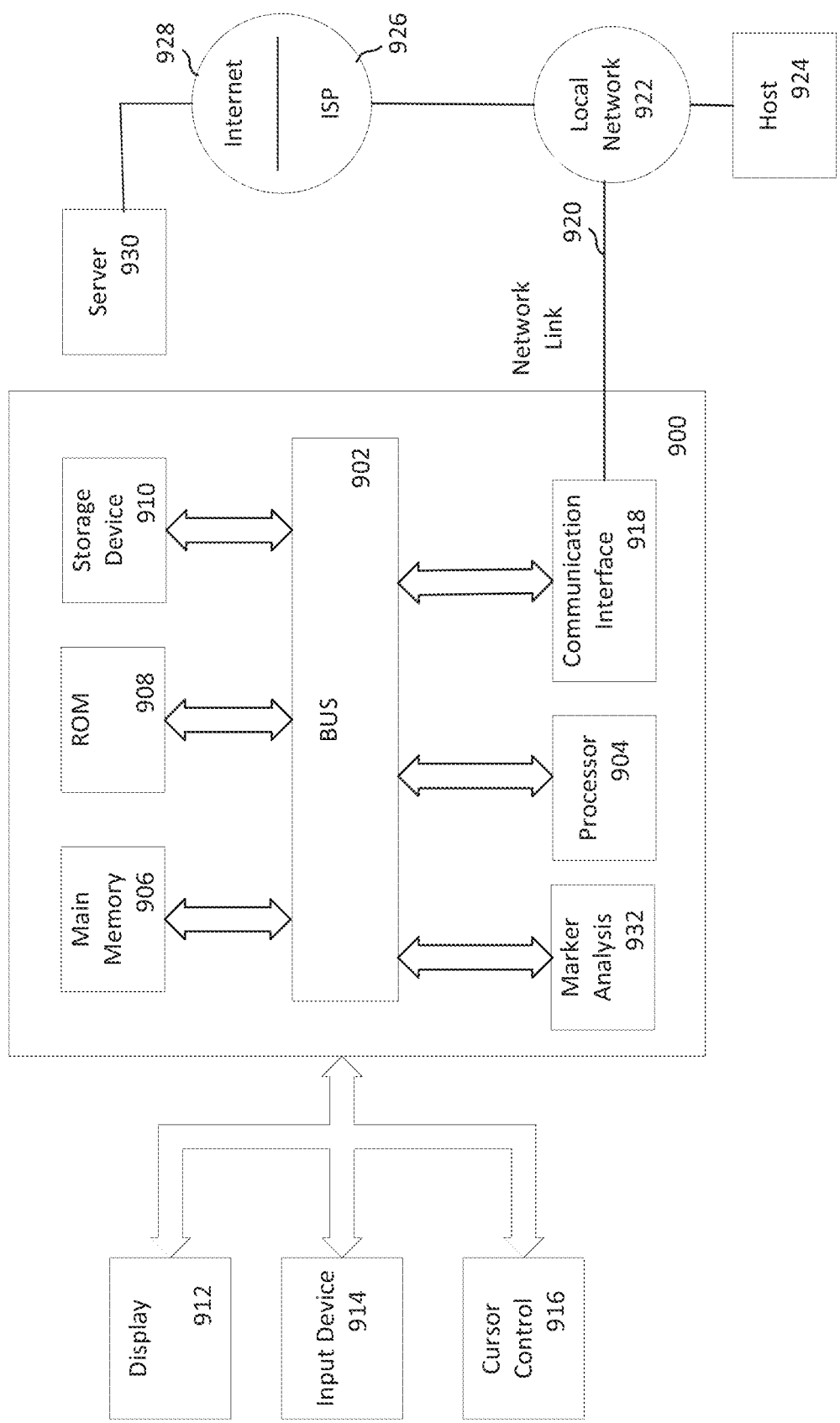
FIG. 9 is a block diagram illustrating an example computer system upon which computer systems of the systems illustrated in FIGS. 1 and 9 may be implemented, in accordance with some implementations.

As shown in FIG. 9, a computer system 900 may be employed upon which the performance capture system (such as 120 in FIG. 1) and/or the CG rendering system (such as 126 in FIG. 1) may be implemented. The computer system 900 includes a bus 902 or other communication mechanism for communicating information, and a processor 904 coupled with the bus 902 for processing information. The processor 904 may be, for example, a general purpose microprocessor. The computer system 900 may include a marker analysis component 932 to determine the marker arrangement from marker data ((for example, items 122 and 124 respectively, of FIG. 1) representing positions of the detected markers.

The computer system 900 also includes a main memory 906, such as a random access memory (RAM) or other dynamic storage device, coupled to the bus 902 for storing information and instructions to be executed by the processor 904. The main memory 906 may also be used for storing temporary variables or other intermediate information during execution of instructions to be executed by the processor 904. Such instructions, when stored in non-transitory storage media accessible to the processor 904, render the computer system 900 into a special-purpose machine that is customized to perform the operations specified in the instructions.

The computer system 900 further includes a read only memory (ROM) 908 or other static storage device coupled to the bus 902 for storing static information and instructions for the processor 904. A storage device 910, such as a magnetic disk or optical disk, is provided and coupled to the bus 002 for storing information and instructions.

The computer system 900 may be coupled via the bus 902 to a display 912, such as a computer monitor, for displaying information to a computer user. An input device 914, including alphanumeric and other keys, is coupled to the bus 902 for communicating information and command selections to the processor 904. Another type of user input device is a cursor control 916, such as a mouse, a trackball, or cursor direction keys for communicating direction information and command selections to the processor 904 and for controlling cursor movement on the display 912. This input device typically has two degrees of freedom in two axes, a first axis (e.g., x) and a second axis (e.g., y), that allows the device to specify positions in a plane.

The computer system 900 may implement the techniques described herein using customized hard-wired logic, one or more ASICs or FPGAs, firmware and/or program logic which in combination with the computer system causes or programs the computer system 900 to be a special-purpose machine. According to one embodiment, the techniques herein are performed by the computer system 900 in response to the processor 904 executing one or more sequences of one or more instructions contained in the main memory 906. Such instructions may be read into the main memory 906 from another storage medium, such as the storage device 910. Execution of the sequences of instructions contained in the main memory 906 causes the processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 910. Volatile media includes dynamic memory, such as the main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 902. Transmission media can also take the form of acoustic or light waves, such as those generated during radio-wave and infrared data communications.

Various forms of media may be involved in carrying one or more sequences of one or more instructions to the processor 904 for execution. For example, the instructions may initially be carried on a magnetic disk or solid state drive of a remote computer. The remote computer can load the instructions into its dynamic memory and send the instructions over a network connection. A modem or network interface local to the computer system 900 can receive the data. The bus 902 carries the data to the main memory 906, from which the processor 904 retrieves and executes the instructions. The instructions received by the main memory 906 may optionally be stored on the storage device 910 either before or after execution by the processor 904.

The computer system 900 also includes a communication interface 918 coupled to the bus 902. The communication interface 918 provides a two-way data communication coupling to a network link 920 that is connected to a local network 922. For example, the communication interface 918 may be an integrated services digital network (ISDN) card, cable modem, satellite modem, or a modem to provide a data communication connection to a corresponding type of telephone line. Wireless links may also be implemented. In any such implementation, the communication interface 918 sends and receives electrical, electromagnetic, or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP) 926. The ISP 926 in turn provides data communication services through the world wide packet data communication network now commonly referred to as the "Internet" 928. The local network 922 and Internet 928 both use electrical, electromagnetic, or optical signals that carry digital data streams. The signals through the various networks and the signals on the network link 920 and through the communication interface 918, which carry the digital data to and from the computer system 900, are example forms of transmission media.

The computer system 900 can send messages and receive data, including program code, through the network(s), the network link 920, and communication interface 918. In the Internet example, a server 930 might transmit a requested code for an application program through the Internet 928, ISP 926, local network 922, and communication interface 918. The received code may be executed by the processor 904 as it is received, and/or stored in the storage device 910, or other non-volatile storage for later execution.

For example, FIG. 9 illustrates the example visual content generation system 900 as might be used to generate imagery in the form of still images and/or video sequences of images. The visual content generation system 900 might generate imagery of live action scenes, computer generated scenes, or a combination thereof. In a practical system, users are provided with tools that allow them to specify, at high levels and low levels where necessary, what is to go into that imagery, and might use the visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

Example Live Action Capture System

Figure 10:
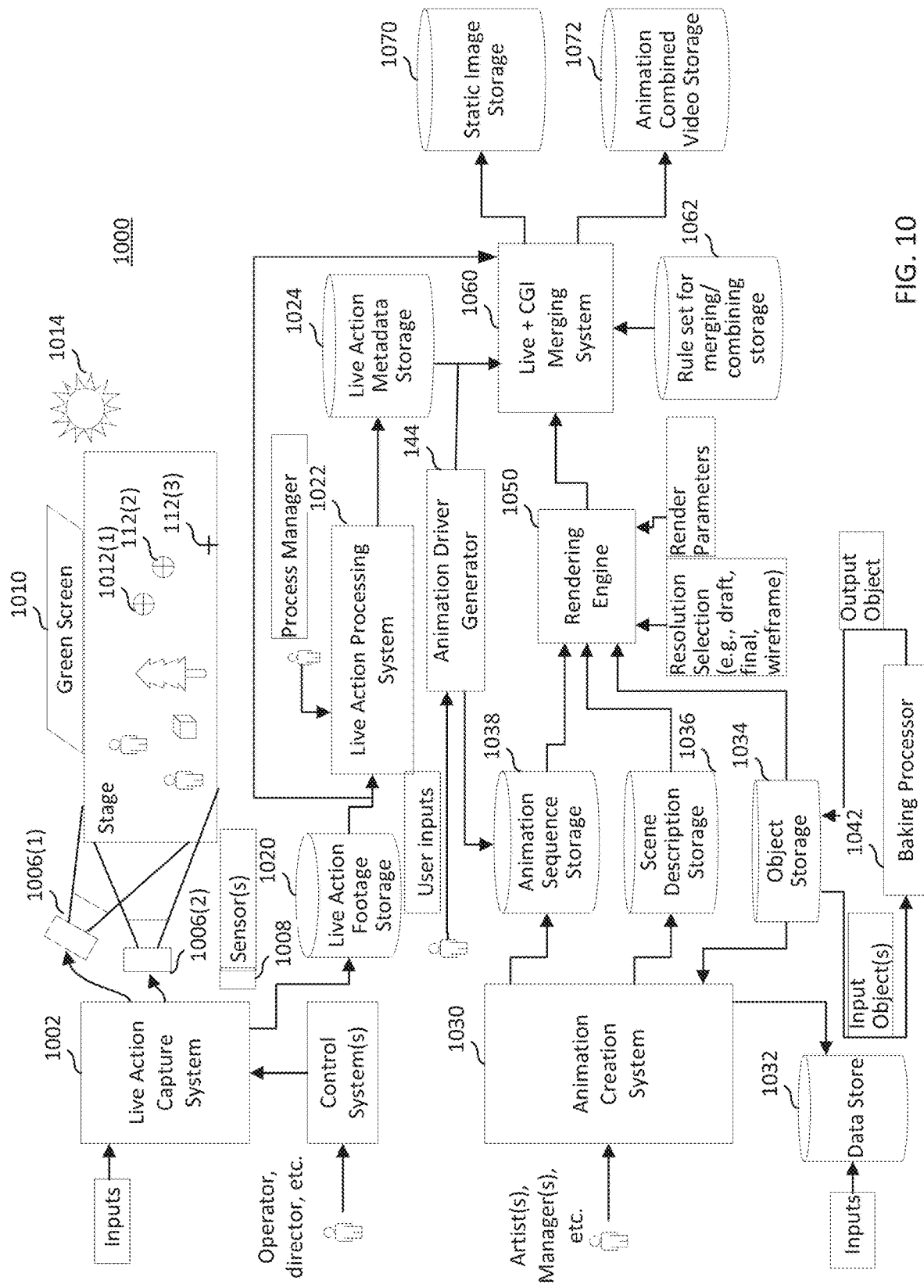
FIG. 10 illustrates an example visual content generation system as might be used to generate imagery in the form of still images and/or video sequences of images, in accordance with some implementations.

As illustrated in FIG. 10, a live action capture system 1002 captures a live scene that plays out on a stage 1004. The live action capture system 1002 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1006(1) and 1006(2) capture the scene, while in some systems, there might be other sensor(s) 1008, which capture information from the live scene (e.g., infrared cameras, infrared sensors, motion capture ("mo-cap") detectors, etc.). On the stage 1004, there might be human actors, animal actors, inanimate objects, background objects, and possibly an object such as a green screen 1010 that is designed to be captured in a live scene recording in such a way that it is easily overlaid with computer-generated imagery. The stage 1004 might also contain objects that serve as fiducials, such as fiducials 1012(1)-(3), that might be used post-capture to determine where an object was during capture. A live action scene might be illuminated by one or more lights, such as an overhead light 1014.

During or following the capture of a live action scene, the live action capture system 1002 might output live action footage to a live action footage storage 1020. A live action processing system 1022 might process live action footage to generate data about that live action footage and store that data into a live action metadata storage 1024. The live action processing system 1022 might include computer processing capabilities, image processing capabilities, one or more processors, program code storage for storing program instructions executable by the one or more processors, as well as user input devices and user output devices, not all of which are shown. The live action processing system 1022 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 1014, as that might be useful in post-processing to match computer-generated lighting on objects that are computer-generated and overlaid on the live action footage. The live action processing system 1022 might operate autonomously, perhaps based on predetermined program instructions, to generate and output the live action metadata upon receiving and inputting the live action footage. The live action footage can be camera-captured data as well as data from other sensors.

An animation creation system 1030 is another part of the visual content generation system 1000. The animation creation system 1030 might include computer processing capabilities, image processing capabilities, one or more processors, program code storage for storing program instructions executable by the one or more processors, as well as user input devices and user output devices, not all of which are shown. The animation creation system 1030 might be used by animation artists, managers, and others to specify details, perhaps programmatically and/or interactively, of imagery to be generated. From user input and data from a database or other data source, indicated as a data store 1032, the animation creation system 1030 might generate and output data representing objects (e.g., a horse, a human, a ball, a teapot, a cloud, a light source, a texture, etc.) to an object storage 1034, generate and output data representing a scene into a scene description storage 1036, and/or generate and output data representing animation sequences to an animation sequence storage 1038.

Scene data might indicate locations of objects and other visual elements, values of their parameters, lighting, camera location, camera view plane, and other details that a rendering engine 1050 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 1030 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 1034 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 1032 might be used to drive object presentation. For example, if an artist is creating an animation of a spaceship passing over the surface of the Earth, instead of manually drawing or specifying a coastline, the artist might specify that the animation creation system 1030 is to read data from the data store 1032 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1044 might read in live action metadata, such as data representing movements and positions of body parts of a live actor during a live action scene, and generate corresponding animation parameters to be stored in the animation sequence storage 1038 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 1022. The animation driver generator 1044 might convert that movement data into specifications of how joints of an articulated CGI character are to move over time.

A rendering engine 1050 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 1050 might include computer processing capabilities, image processing capabilities, one or more processors, program code storage for storing program instructions executable by the one or more processors, as well as user input devices and user output devices, not all of which are shown.

The visual content generation system 1000 can also include a merging system 1060 that merges live footage with animated content. The live footage might be obtained and input by reading from the live action footage storage 1020 to obtain live action footage, by reading from the live action metadata storage 1024 to obtain details such as presumed segmentation in captured images segmenting objects in a live action scene from their background (perhaps aided by the fact that the green screen 1010 was part of the live action scene), and by obtaining CGI imagery from the rendering engine 1050.

A merging system 1060 might also read data from a rulesets for merging/combining storage 1062. A very simple example of a rule in a ruleset might be "obtain a full image including a two-dimensional pixel array from live footage, obtain a full image including a two-dimensional pixel array from the rendering engine 1050, and output an image where each pixel is a corresponding pixel from the rendering engine 1050 when the corresponding pixel in the live footage is a specific color of green, otherwise output a pixel value from the corresponding pixel in the live footage."

The merging system 1060 might include computer processing capabilities, image processing capabilities, one or more processors, program code storage for storing program instructions executable by the one or more processors, as well as user input devices and user output devices, not all of which are shown. The merging system 1060 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 1060, such as modifying boundaries of segmented objects, inserting blurs to smooth out imperfections, or adding other effects. Based on its inputs, the merging system 1060 can output an image to be stored in a static image storage 1070 and/or a sequence of images in the form of video to be stored in an animated/combined video storage 1072.

Thus, as described, the visual content generation system 1000 can be used to generate video that combines live action with computer-generated animation using various components and tools, some of which are described in more detail herein. While the visual content generation system 1000 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Although the description has been described with respect to particular embodiments thereof, these particular embodiments are merely illustrative, and not restrictive. For example, in some implementations, a plurality of image capture devices may be used to capture images from various angles of the same live action scene or to capture different portions of the live action scene and the images may be stitched together or particular images selected for the output image. In various implementations, additional equipment, techniques and technologies may be employed to accommodate requirements of a particular visual production and live action scene, such as underwater scenes.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used.

Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above. A computer readable medium can comprise any medium for carrying instructions for execution by a computer, and includes a tangible computer readable storage medium and a transmission medium, such as a signal transmitted over a network such as a computer network, an optical signal, an acoustic signal, or an electromagnetic signal.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A receptacle to house an active marker light component that emits light of at least one wavelength range in a performance capture system, the receptacle comprising:
  a protrusion portion configured to fit through an opening in a wearable article for placement of the protrusion portion on an outer side on an exterior of the wearable article, at least a section of the protrusion portion being transmissive to one or more wavelengths of the light emitted from the active marker light component into a chamber of the protrusion portion; and
  a base portion coupled to a lower side of the protrusion portion, wherein the base portion includes:
    a ledge to butt against an inner side of the wearable article for placement of the base portion underneath the wearable article; and
    at least one channel extending to the chamber, the at least one channel for receiving a strand coupled to the active marker light component to enable positioning of the active marker light component within the receptacle, wherein the at least one channel of the base portion includes one or more bumps on at least one wall of the at least one channel, and sized or shaped to reduce slippage of the strand in the at least one channel.

2. The receptacle of claim 1, further comprising:
  a fitting to removably connect around at least a part of the protrusion portion at the outer side of the wearable article, wherein the fitting is configured to secure the base portion on the inner side of the wearable article.

3. The receptacle of claim 2, wherein an outer rim diameter of the base portion is greater than a diameter of the protrusion portion at a junction between the protrusion portion and the base portion.

4. The receptacle of claim 2, wherein the fitting includes a color distinct from a color of the outer side of the wearable article.

5. The receptacle of claim 2, wherein the fitting is opaque for preventing leakage of the light from the active marker light component through the base portion.

6. The receptacle of claim 2, wherein the fitting includes at least one ridge to rotatably engage with a corresponding groove in an exterior surface of the protrusion portion.

7. The receptacle of claim 1, wherein the one or more bumps include a plurality of bumps in alternating positions with corresponding bumps on opposing walls of the channel.

8. A receptacle to secure an active marker light component in a performance capture system to a wearable article, the receptacle comprising:
  a protrusion portion configured to fit through an opening in the wearable article for placement of the protrusion portion on an outer side of the wearable article, at least a section of the protrusion portion being transmissive to one or more wavelengths of the light emitted from the active marker light component into a chamber of the protrusion portion;
  a base portion coupled to a lower side of the protrusion portion and comprising a ledge to butt against an inner side of the wearable article for placement of the base portion underneath the wearable article; and
  a fitting to removably connect around at least a part of the protrusion portion at an outer side of a wearable article, the fitting including a lower side that forms a space between the base portion and the lower side of the fitting, wherein the space is configured to accommodate a portion of the wearable article in the space, and wherein the fitting is configured to secure the base portion on an inner side of the wearable article.

9. The receptacle of claim 8, wherein the fitting includes a color distinct from a color of the outer side of the wearable article.

10. The receptacle of claim 8, wherein the fitting is opaque for preventing leakage of the light from the active marker light component through the base portion.

11. The receptacle of claim 8, wherein the fitting includes at least one ridge to rotatably engage with a corresponding groove in an exterior surface of the protrusion portion.

12. The receptacle of claim 8 further comprising a power source to supply power to the active marker light component.

13. A performance capture system, comprising
a plurality of active marker light components that are coupled to a strand and that emit light of at least one wavelength range;
a plurality of receptacles, each corresponding with a respective active marker light component of the plurality of active marker light components, wherein each receptacle comprises:
a protrusion portion configured to fit through an opening in a wearable article for placement of the protrusion portion at an outer side on an exterior of the wearable article and comprising a slot to receive the respective active marker light component, wherein at least a section of the protrusion portion is transmissive to at least one wavelength of the light emitted from the respective active marker light components into a chamber of the protrusion portion; and
a base portion coupled to a lower side of the protrusion portion, wherein the base portion includes:
a ledge to butt against an inner side of the wearable article for placement of the base portion underneath the wearable article; and
at least one channel extending from an exterior port to an interior of the receptacle, wherein the at least one channel is configured to receive the strand, and wherein the at least one channel of the base portion includes one or more bumps on at least one wall of the at least one channel, and sized or shaped to reduce slippage of the strand in the at least one channel; and
at least one sensor device to detect the at least one wavelength of light from the at least section of the protrusion portion.

14. The performance capture system of claim 13, wherein the plurality of receptacles further comprise a fitting configured to removably connect around at least a part of the protrusion portion on the outer side of the wearable article, and
wherein the system further comprises:
a camera device to detect at least one of a shape, color, or visible light of the fitting.

15. The performance capture system of claim 14, wherein the fitting includes a color and the system further comprises a camera device to detect the color.

16. The receptacle of claim 13, wherein the strand is non-conductive.

17. The performance capture system of claim 13, wherein the strand includes one or more wires configured to provide at least one of: electrical communication between a control unit and the plurality of active marker light components, or power to the plurality of active markers components.

18. The performance capture system of claim 13, wherein at least one active marker light component of the plurality of active marker light components is configured to emit multiple wavelengths of light and wherein each of one or more sections of the protrusion portion of the corresponding receptacle are transmissive to a different wavelength of the multiple wavelengths of the light.

19. The performance capture system of claim 18, wherein the receptacles release a first wavelength of light in a first direction from a section of the protrusion portion and a second wavelength of light in a second direction of the protrusion portion, wherein the first wavelength of light and the second wavelength of light are emitted by the at least one active marker light component.

20. The performance capture system of claim 13, wherein the protrusion portion of one or more receptacles of the plurality of receptacles, includes one or more opaque sections that are non-transmissive to the at least one wavelength of the light emitted from the respective active marker light component.

* * * * *